United States Patent [19]

Gregg et al.

[11] Patent Number: 5,504,732
[45] Date of Patent: Apr. 2, 1996

[54] NULL INFLECTION DETECTION AND PULSE EXPAND LATCH IN AN OPTICAL RECORDING SYSTEM

[75] Inventors: David P. Gregg, Culver City; Kitchener C. Wilson, Santa Barbara; Stephen K. Shu, Fountain Valley, all of Calif.

[73] Assignee: Del Mar Avionics, Irvine, Calif.

[21] Appl. No.: 570,144

[22] Filed: Aug. 15, 1990

(Under 37 CFR 1.47)

[51] Int. Cl.⁶ .................................................. G11B 7/125
[52] U.S. Cl. ........................... 369/116; 369/54; 369/109; 369/58; 356/237
[58] Field of Search .......................... 369/116, 54, 58, 369/32, 112, 272, 277, 109; 356/237

[56] References Cited

U.S. PATENT DOCUMENTS

| | | | |
|---|---|---|---|
| 4,197,011 | 4/1980 | Hudson | 356/237 |
| 4,352,564 | 10/1982 | Roach | 356/237 |
| 4,412,743 | 1/1983 | Eberly | 369/58 |
| 4,464,050 | 8/1984 | Kato | 356/237 |
| 4,505,585 | 3/1985 | Yushikawa | 369/58 |
| 4,508,450 | 4/1985 | Oshina | 369/58 |
| 4,541,716 | 9/1985 | Crooks et al. | 356/237 |
| 4,611,318 | 9/1986 | Winslow | 369/54 |
| 4,648,085 | 3/1987 | Shimonou | 369/54 |
| 4,693,608 | 9/1987 | Kitaqawa | 356/237 |
| 4,794,264 | 12/1988 | Quackenbos et al. | 356/237 |
| 4,794,265 | 12/1988 | Quackenbos | 356/237 |
| 4,832,487 | 5/1989 | Mikuriya et al. | 369/53 |
| 4,908,815 | 3/1990 | Gregg et al. | 369/116 |
| 4,931,336 | 6/1990 | Haneda | 369/272 |
| 5,218,591 | 6/1993 | Shimamoto et al. | 369/116 |
| 5,255,007 | 10/1993 | Bakx | 369/116 |

Primary Examiner—Georgia Y. Epps
Assistant Examiner—Kim-Kwok Chu
Attorney, Agent, or Firm—W. D. English; J. D. Liembach

[57] ABSTRACT

A novel method and apparatus utilizing conventional photoreactive and reflective layers of a recording medium for optically recording and reading both digital and variable length, analog pulses of data, in an exacting manner to eliminate excess energy absorption by the medium and for reducing latent recording errors due to defects in the recording medium as well as due to the recording process itself. With this precise recording and reading technique, analog variable-length pulse recording, with its inherent wide bandwidth, as well as coded digital pulse recording, with its inherent narrow bandwidth, can be accommodated. The system monitors the optical transmissivity and reflectivity of the recording medium during the recording process in real time to accurately determine initial and terminal inflection points denoting inception and end of a recorded pulse in an exacting manner and to pinpoint and make allowances for recording defects which may yet yield errors on playback. A residual error reduction technique complements the variable pulse recording process by detecting and temporarily storing data and respective address at which data could not be accurately recorded due to chemical or physical anomalies in the recording medium.

22 Claims, 16 Drawing Sheets

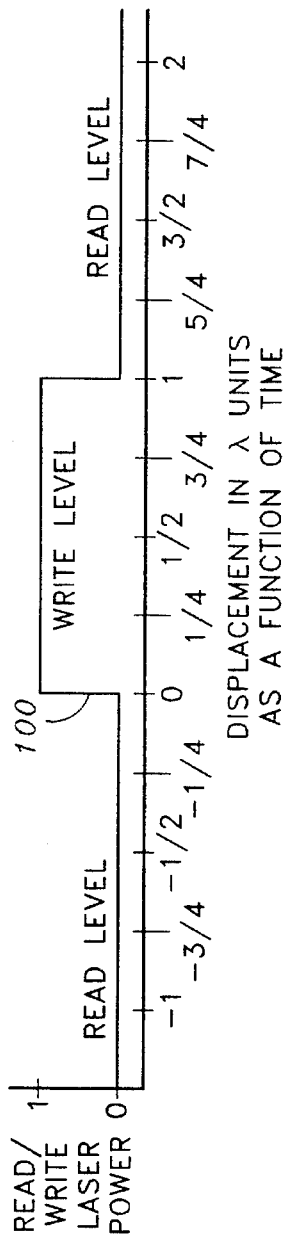
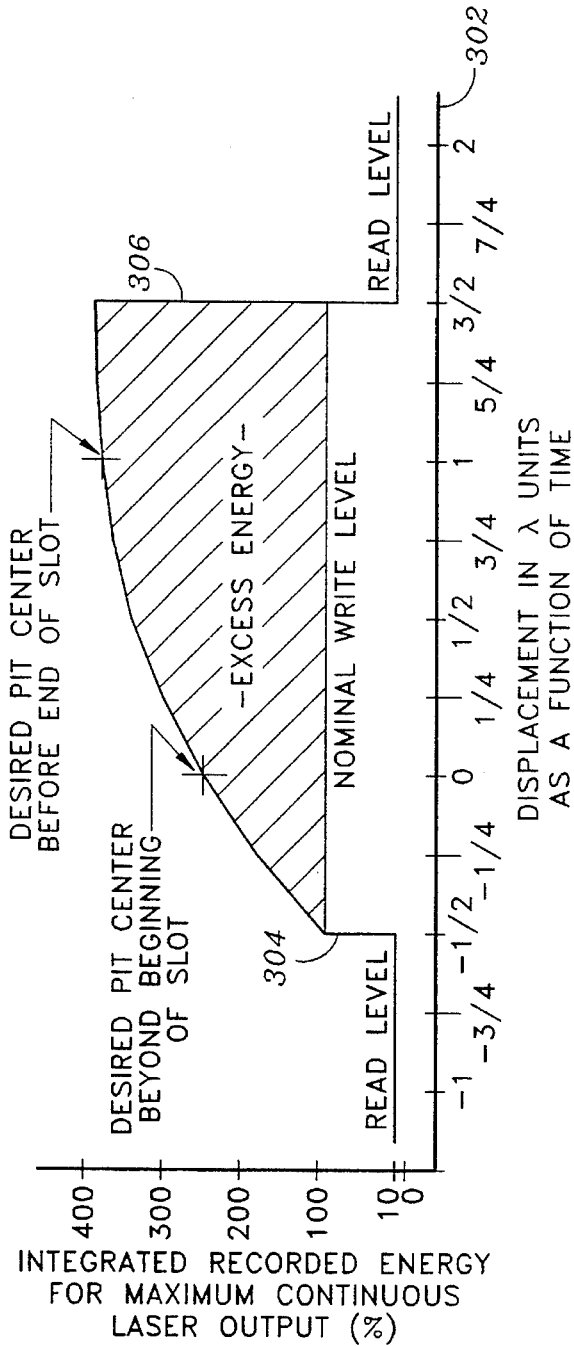

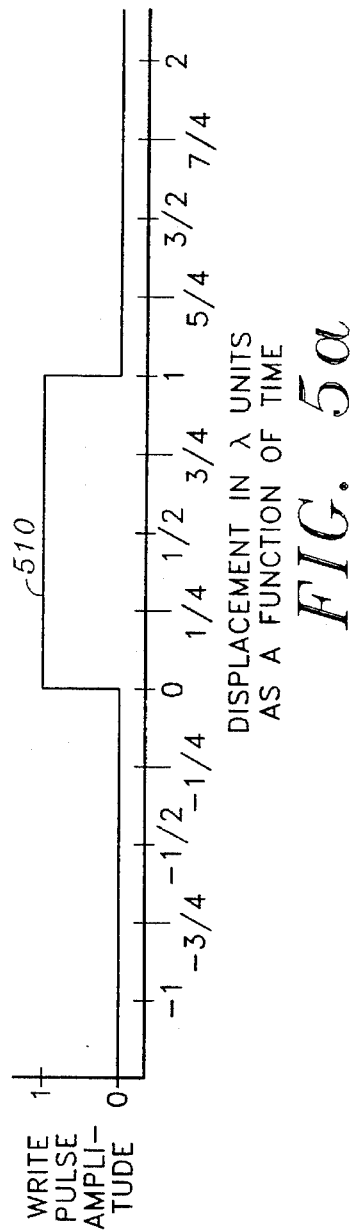

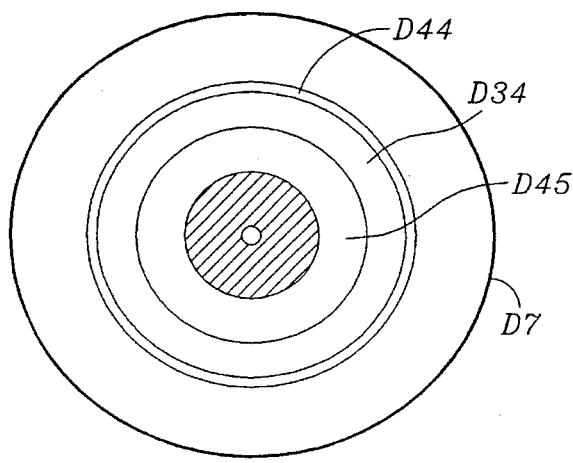
*FIG. 11*
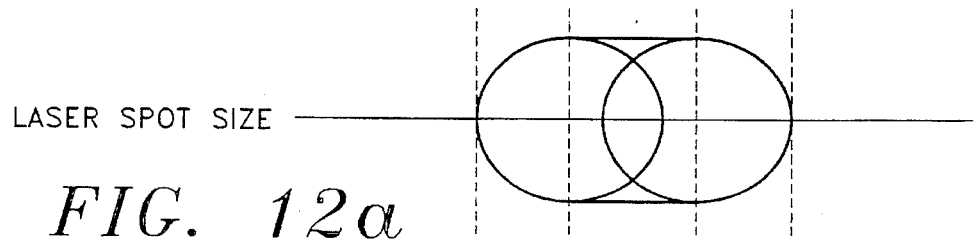
LASER SPOT SIZE
*FIG. 12a*
TYPICAL WAVEFORM OF ONE DATA ELEMENT TO BE RECORDED
*FIG. 12b*
RECORD WAVEFORM POWER
*FIG. 12c*
PLAYBACK WAVEFORM REFLECTION
THRESHOLD LEVEL       THRESHOLD LEVEL
*FIG. 12d*

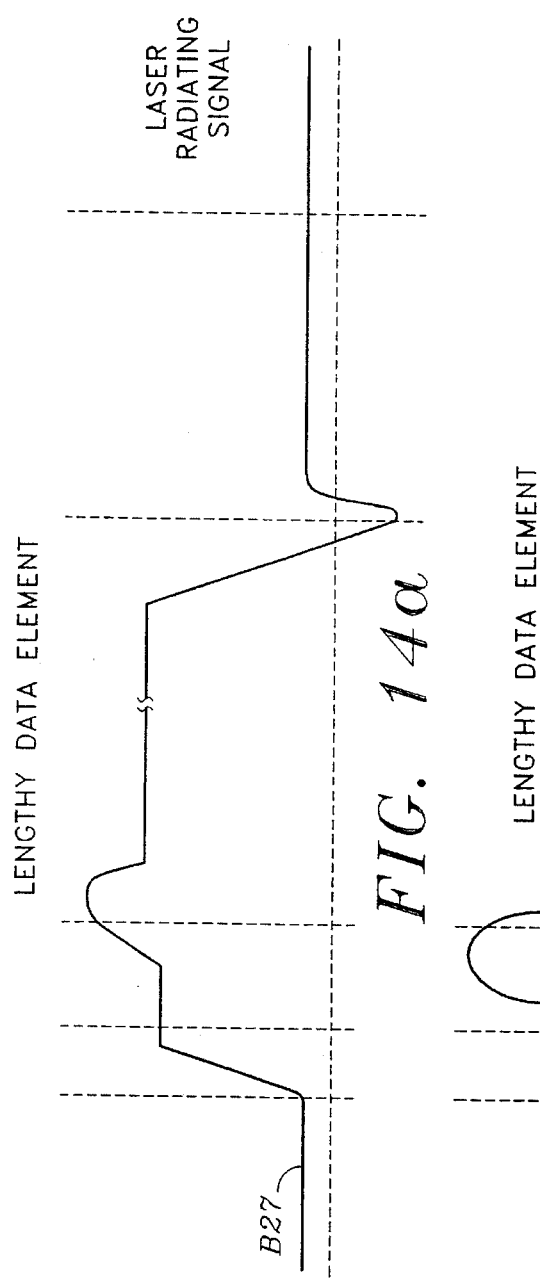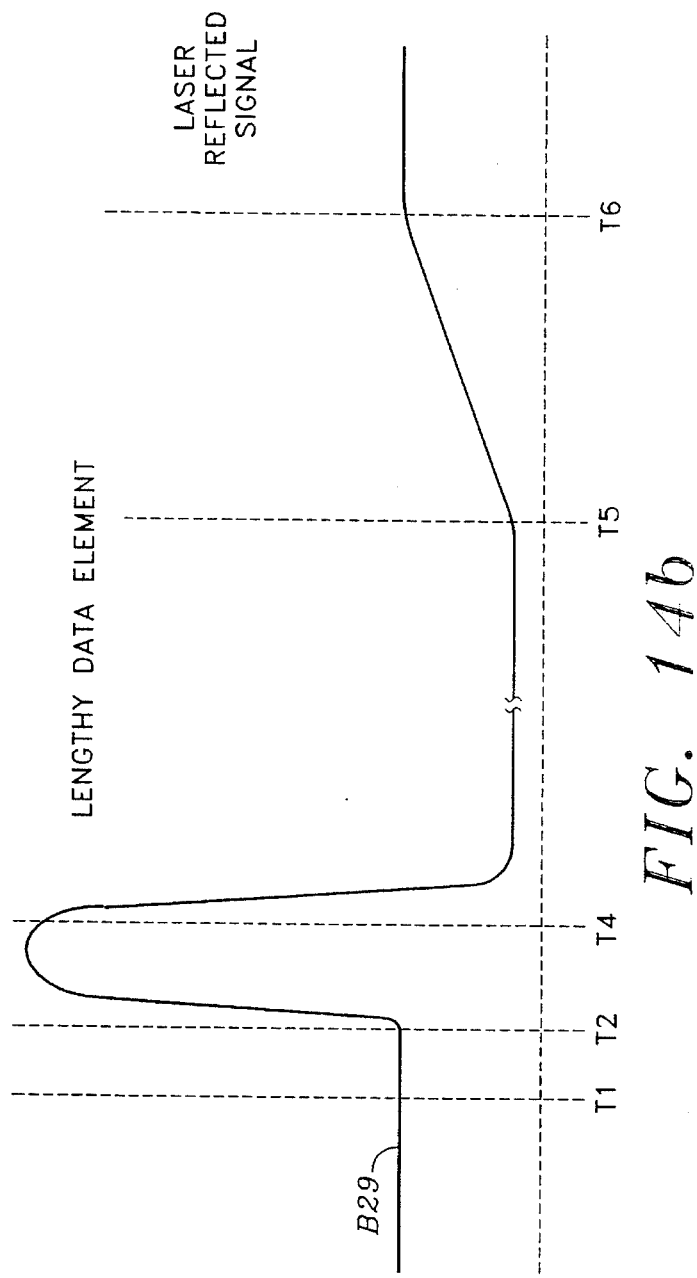

RECORD MODE

PLAYBACK MODE

NULL INFLECTION DETECTION AND PULSE EXPAND LATCH IN AN OPTICAL RECORDING SYSTEM

BACKGROUND OF THE INVENTION

1. Field of the invention

The present invention relates to the recording and playback of information on optical cards, discs or tape. More particularly, the invention relates to a method and apparatus for accurately recording both digital and variable length or analog pulses by real time monitoring of pulse initiation and termination, null inflective points, and further detecting and eliminating latent recording errors due to anomalies in the recording medium or due to the recording process itself.

2. Description of Background Art

In U.S. Pat. No. 4,908,815, Mar. 13, 1990, the present inventors, Gregg, Shu and Wilson, disclosed an Optical Recording System utilizing Proportional Real-Time Feedback Control of Recording Beam Intensity. In that patent, the disclosure of which is hereby incorporated by reference into the present disclosure, a novel and highly effective system for accurately recording data via a real time feedback network to minimize errors in recording on an optical medium was disclosed.

A primary application for the prior-disclosed system is the reduction of recording errors in the recording of data on optical discs, of the type on which data is recorded by altering an optical property of a photo-sensitive or photo-reactive layer on the disc.

One commonly used type of optical disc usable in the prior-disclosed system has a reflective metallic coating overlain by a photo-sensitive or photo-reactive, transparent layer. On such discs, regions which contain no recorded data are highly reflective. Locations on the disc on which data have been recorded have reduced reflectivity, owing to the chemical or physical alteration of the photo-reactive layer overlying the reflective layer caused by the recording process.

As was described in detail in the prior disclosure and summarized below, the control of recording beam intensity by a closed-loop feedback control system previously disclosed by the present inventors provides an effective means for reducing recording errors to substantially lower levels than were obtainable with prior art systems. However, certain gross chemical or physical anomalies may exist in the surface or grooves of an optical disc to be recorded. Thus, microscopic pits, deformed grooves or inclusions in a recording surface may be beyond the capabilities of the prior-disclosed error minimization system to compensate thereby resulting in some residual recording errors.

The present invention, as disclosed herein, is intended to provide a new method and apparatus for accurately recording variable length pulses such as analog data and for reducing residual errors in recording on an optically sensitive medium. Such reduction of errors should be so complete that not only digital may be recorded and read, but also wide band analog recording can be accomplished based on the burst length of pulses recorded as the recording beam passes along the recording track, thereby enabling an entirely new dimension in the recording and playback of information on optical discs, heretofor unknown and undiscovered.

The invention discloses a process and apparatus that permits the accurate writing and reading of pulses of varying width by means of continuous, real-time control of the write power by taking into account that said power is finite and that there may be a variety of thresholds and sensitivities in the photosensitive media employed, as well as physical or chemical anomalies or variations within a given medium for any optically recordable disc or tape surface.

In return-to-zero (RZ) recording, only the presence or absence of recorded pits need be read; however, the more widely used non-return-to-zero (NRZ) recording methods may employ a multiplicity of contiguous "highs" in various combinations resulting in combined "on" pulses of integrally stepped widths. For example, in contemporary Compact Disc (CD,) format of digital audio discs, recorded pulses may vary between 0.9 and 3.3 micrometers (um) long, corresponding to between 3 and 11 data bits or data elements, respectively, in steps of 0.3 um long. Correct reading of the number of data bits per pulse is therefore required, such as parity bit error detecting schemes, otherwise an elaborate, band-width-consuming error correction code scheme is necessary. Similarly, in another format (Laser Vision,) for combined video and audio duplication and recording in real-time, signals are frequency-modulated (FM) during mastering (duplicating) and during writing (recording) on recordable discs as well as on optical tapes. In either case, considerable digital data are necessary in the vertical blanking interval section of the disc in addition to digital audio channels.

In the case of Laser Vision, limited error reduction may be achieved with high modulation frequencies but at the expense of bandwidth. In addition, extreme care must be provided during each step of replication of the disc. In existing, smaller, portable, direct recording and playback of digital and FM signals, lower levels of precision and lower costs usually prevent, among other measures, the use of externally modulated continuous lasers of relatively short wavelengths, presently utilized in conventional disc mastering processes. Laser diodes, in small or portable optical recorders or duplicators, are virtually mandated due to their simplicity, internal modulability, efficiency, small size and low cost. However, weighing against these advantages are the disadvantages of lower optical output power and longer wavelengths involved with use of laser diodes. Existing laser diode wavelengths approximate the length of a minimum bit or data element to be recorded, in the realm of 1 um, and places the system well into an optical diffraction limited region where beam wavelength and minimum recordable data element size very nearly conform. Although laser diodes exhibit fast rise and decay times, the power limitations, both peak and average, may impose severe restrictions on the bandwidths to be written unless novel means are employed.

In order to understand the novelty of the invention, it is necessary to more particularly review the current practice of optical recording technology. Assuming that the photosensitive medium to be recorded on is stationary with respect to the write means, a write pulse (spike) of unitary amplitude is fed to the recording system, the write pulse width being that which, when converted to optical power, will produce a write beam of a specific diameter. Said diameter is taken to be the customary width of a Gaassian beam, essentially equal to the beam's wavelength and which encompasses over 80% of the beam power.

For sake of simplicity, it is assumed that a constant power density per unit area is provided within the beam diameter on the reflective photosensitive surface. It is further assumed for sake of simplicity of explanation that the width of the write pulse is of such amplitude and duration that the resulting thermal energy will effect a pit of ¼ wavelength ($\lambda$) in depth which causes a destructive interference pattern and therefor minimum reflectivity. The pit is produced by the heat-absorption of the photosensitive surface but may comprise any optical effect which will yield a minimum reflectivity when an ideal data element is recorded.

In a conventional embodiment of the optical disc discussed herein a highly reflective coating is applied to the photosensitive layer which, in turn, is supported by a transparent substrate. The reflective layer is then covered by a compliant protective layer. The recording spike creates a reaction in the optically active layer causing a curved deflection bending, or pitting of the reflective layer. For minimum reflection, the deflection or pit depth is in the order of ¼ wavelength of the laser beam and creates a truncated conical or approximately cylindrical pit effect. In the production of the truncated conical approximately cylindrical pit, the duration of the recording spike was so short that it was assumed that the recordable medium was essentially stationary, hence the center of the pit conforms in displacement and time with the beam spike. However, this assumption cannot hold for pulses longer than a spike since the recordable surface is not stationary with respect to the beam.

If, on the other hand, it is desirable to record information in an optical medium that employs other than digital recording techniques it would be desirable to form an elongated pit of variable length in addition to approximately cylindrical pits. However, before proceeding with the mechanics of a prolonged pit, or slot, it is necessary to demonstrate how the approximately cylindrical pit is read. For an approximately cylindrical pit to be produced by a spike occurring at a time along the optical path corresponding to zero "0" displacement, the pit will have an effective diameter of approximately one wavelength and will be aligned with and centered the laser beam. The cylindrical wall of the pit, spanning a diameter of one wavelength will be sloping evenly and symmetrically. Now on reading the recorded pit, the leading edge of the read beam, also of one wavelength, at a half wavelength of displacement in advance of the pit center, begins to approach and to detect the drop in reflected energy provided by the gradual slope of the pit wall, i.e. there is a gradual decrease in reflection. The reflected energy drops to a narrow null at the pit center (a depth of ¼ wavelength) and then gradually rises symmetrically at the other side of the pit wall to the fully reflective recording medium surface level, outside the pit. Therefore, detection of the pit walls per se is relatively indeterminate when practical considerations are taken into account. Only detection of an instantaneous null inflection point at the center of the pit can provide accurate information of pit location and therefore timing.

Again, considering a unity (100%) amplitude pulse of one wavelength in duration, a pit would be formed with the rise of the pulse at zero displacement. However, the write beam, held at that constant power level throughout progresses synchronously with the pulse as a function of time along the recording track and imparts cumulative and therefor excessive beam energy across the pit diameter. At the intersection of the centerline of the optical path with the nearly distal edge of a pit or slot, there accumulates an excess of energy approaching 400% more than that which initiated pit formation. The excess energy trails off to zero at the distal end of the pit or slot. The end result of this phenomenon may be a "teardrop" effect often observed under a microscope after writing a data element. In the case of a reflective disc, in which the accuracy of differential displacement of the reflective layer is critical, it is impossible for a flat-bottomed pulse and a corresponding optical footprint of constant amplitude write-beam to yield an ideal flat-bottomed slot between initial and terminal edges of the pit; i.e. the teardrop effect not only tends to enlarge pit width but also pit depth. In the intermediate stage in the progression of the write-beam from one side of the pit or slot to the other side, cumulative excess beam energy is experienced by the photosensitive layer, which further expands and drives the reflective layer in the process. This process creates a downward sloping ramp of an optical footprint. The end result is that, mainly in the downward ramp, part of the reflective layer in the bottom of the slot may be driven past the non-reflective phase and even into another reflective phase, or beyond, depending upon the optical characteristics of the medium.

A substantial number of prior art references disclose methods for detecting defective regions of an optical recording medium on a substrate. Those references known by applicant consist of the following U.S. Pat. Nos.:

4,197,011, Hudson, Apr. 8, 1980, Defect Detection and Plotting System;
4,352,564, Roach, Oct. 5, 1982, Missing Order Defect Detection Apparatus;
4,412,743, Eberly, Nov. 1, 1983, Off-Axis Light Beam Defect Detector;
4,464,050, Kato, et al., Aug. 7, 1984, Apparatus For Detecting Optically Defects;
4,505,585, Yoshikawa, Mar. 19, 1985, System For Detecting Defects On An Optical Surface
4,508,450, Oshima, Apr. 2, 1985, System For Checking Defects on A Flat Surface Of An Object;
4,541,716, Crooks, et al., Sep. 17, 1985, Detection of Defects In A Circular Or Spiral Diffraction Grating;
4,693,608, Kitagawa, Sep. 15, 1987, Method And Apparatus For Determining Position Of Points On An Article;
4,794,264, Quackenbos, et al., Dec. 27, 1988, Surface Defect Detection And Confirmation System And Method;
4,794,265, Quackenbos, et al., Dec. 27, 1988, Surface Pit Detection System And Method; and
4,832,487, Mikuriya, et al., May 23, 1989, Test System For Optical Discs.

None of the above-cited prior art references, or any other references that the applicant is aware of, discloses an analog recording process or a residual error reduction method for optical recording errors detected in real time during the recording process, and the location of the improperly recorded data, along with correct data, stored in a different location on an optical disc. Moreover, none of the prior art references known to the present applicant discloses the use of an error signal, from an open or closed servo loop controlling a recording light beam, to detect defective recording regions prior to, during and after recording each location on an optical disc. In addition, no references of which applicant is aware is disclosed herein which permits the degree of accuracy in optical data track pulse initiation and termination required such that analog wide band recording in addition to existing digital recording art is practical.

OBJECTS OF THE INVENTION

An object of the present invention is to provide an integrated quality control method and apparatus for eliminating errors in the recording and playback of optical recording discs.

Another object of the invention is to provide means for monitoring characteristics of an optical recording medium during the recording process.

Another object of the invention is to enable creation of and to utilize a highly accurately recorded optical data element for both digital and analog pulse recording as well as any other data recording and playback formats such as frequency modulation, pulse code modulation, etc.

Another object of the invention is to provide precision sensing means to determine inflection points at the real beginning and end of a pulse data element recorded on an optical track such that time duration of the passing of said pulse under a beam is accurate within a wide band of recording time intervals.

Another object of the invention is to provide means for detecting a recording error at substantially the same time as the error occurs.

Another object of the invention is to record on a separate location on an optical disc, referred to as a Data Error Section, those locations on the disc at which recording errors occurred, along with the data that was intended to be stored at those defective locations.

Another object of the invention is to provide a residual error reduction method and apparatus for optical recording in which corrected data from the Data Error Section is substituted for data from primary data storage tracks on an optical disc, when improperly recorded regions of the disc are played back.

Various other objects and advantages of the present invention, and its most novel features, will become more readily apparent to those skilled in the art by reading the accompanying specifications and claims.

It is to be understood, however, that although the invention disclosed herein is fully capable of achieving the objects and providing the advantages described, the characteristics of the invention described herein are merely illustrative of the preferred embodiment. Accordingly, applicant does not intend that the scope of exclusive rights and privileges in the invention be limited to details of the embodiments described. Applicant intends that equivalents, adaptations and modifications of the invention reasonably inferable from the description of the invention contained herein be included within the scope of the invention as defined by the appended claims.

SUMMARY OF THE INVENTION

The present invention comprehends a method and apparatus for accurately recording variable length or analog data pulses and for reducing errors in the recording and playback of data in optical recording systems. The method and apparatus are particularly well suited to optical record/playback systems which employ a modulated laser beam to reduce the transparency of a photo-reactive layer or reflectivity of a reflective layer on a rotating optical disc where various time formatted pulses are to be recorded including: pulse width modulation, digital, analog, frequency modulation, pulse width modulation and pulse code modulation.

Real time monitoring and detection of null inflection points to enable exact and accurate recording and duplication of data by preventing cumulative, overlapping or excessive laser energy buildup not only allows analog as well as digital recording capability but also effectively eliminates the well known and undesirable "tear drop effect."

In the present invention, during the read mode, a constant and continuous laser beam is focused upon the recorded path of a turning optical disc at a detecting radiant power level only sufficient to detect usefully the presence of reflective and nonreflective pits at time based intervals, but not sufficient to cause the creation of any nonreflective pits.

During the recording mode, whenever in the same optical path at time-based intervals the laser beam is switched to a higher radiant power sufficient to cause the reflectivity of the pit being produced to decrease, the reflectivity simultaneously and continuously is being detected by reading means, compared with the ideal reflectivity, the difference between both reflectivities being measured, the measurement being fed back to control in real time the radiant power of the beam.

Hence the reflectivity of the recorded pit always approaches the ideal to the degree permitted by the variations in the photosensitivity, dimensions and the presence of minor flaws throughout the optical path of the disc.

When variations and flaws in the disc exceed the capability of the recording beam power, an error indication is produced.

In the residual error reduction portion of the present invention, a stream of data pulses to be recorded is stored temporarily in a First Memory Means. Preferably, the First Memory Means is a first-in-first out (FIFO) register, and referred to as a Record Data FIFO. Data to be recorded is gated from the Record Data FIFO by system control logic to a laser driver amplifier, located in the Record/Playback section of an optical disc recorder, as will be described below.

In the present invention, the recording surface of an optical disc is monitored continuously during the recording process by means of photo-detectors responsive to that part of an incident laser beam reflected off the surface of an optical disc. A relatively high level of laser power is used to record data on the optical disc, while a lower power level is used during playback to read the pattern of data previously recorded on the disc.

In the novel residual error reduction method according to the present invention, the recording medium on an optical disc is monitored prior to recording data output from the Record Data FIFO. This is to verify that the recording medium is sufficiently transparent to be recognized as no pulse upon playback. During the process of recording pulse on the medium, the reflected portion of the laser signal is monitored in real time to verify that it initially increases to a high level for a short duration (spike) as the laser beam power is increased from a low, read or playback level to a high, record power level sufficient to suitably alter the photo-reactive recording medium.

At the end of the interval for recording a pulse or a series of such pulses in the case of non-return-to-zero (NRZ) data encoding, the reflectivity of the spot or strip irradiated by the laser is again checked, to verify that the transmission of the optical recording medium has been reduced to a low value, signifying successful recordation of data.

As rotation of the optical disc causes a recorded area to move away from the laser and photo sensor, the recording medium is again monitored to verify that its transmissibility increases to a value sufficiently high to represent a non recorded area, and thereby completing a verification test cycle.

If each of the tests described above is passed, it is concluded that a data pulse has been successfully recorded on the optical medium. The next data element to be recorded is then output from the Record Data FIFO to the laser driver amplifier in the Record/Playback section of the optical disc recorder. A sequence of such data elements is recorded in one or more annular rings on the disc in an annular region referred to as a Data File Section.

If any of the recording tests described above fails, any data elements that were not successfully recorded are stored in a Second Memory Means, preferably a FIFO called an Error Data FIFO. After a complete data file has been recorded on the disc, data elements which were unsuccessfully recorded and stored in the Error Data FIFO are recorded in a different location, preferably in a contiguous region of the optical disc following the Data File Section, referred to as the Data Error Section. The address of the Data File Section where each unsuccessfully recorded datum should have been located is stored with the correct data in the Data Error Section.

After a complete data file has been recorded in the Data File Section as described above, and any data which failed to be recorded properly have been recorded in the Data Error Section, additional "house-keeping" data are recorded in an inner annular section of the optical disc, referred to as the File Directory Section. The additional data recorded in the File Directory Section of the disc include the file name and address, location of data which were not successfully recorded in the Data File Section, and the address of the locations in the Data Error Section where the correct data are recorded.

In the playback mode, according to the present invention, the laser read head is initially positioned over the File Directory Section. Here the addresses of each location in the Data File Section where a recording error occurred, and the address of the location in the Data Error Section where the correct data is stored, are placed within memory locations in control logic within the system. The laser read head is then positioned over the Data Error Section, and corrected data are read out and stored in a Third Memory Means, called a Correcting Data Buffer Register.

The laser read head is then positioned over the Data File Section of the disc. Data read out from the Data File Section is input to a first input terminal of a data formatting and switching device which will be referred to as a "multiplexer." A second input terminal of the multiplexer is connected to the output terminal of the Correcting Data Buffer. The output terminal of the multiplexer is connected to the input terminal of a third, Playback Data FIFO. When data are read out from the Data File Section of the optical disc, a signal generated by the control logic and applied to the control input terminal of the multiplexer causes the multiplexer to insert into the output data stream correcting data from the Correcting Data Buffer, at those locations of the Data File Section where recording errors occurred. Thus, data assembled into the Playback Data FIFO contains the correctly recorded data from the Data File Section of the disc, interleaved where necessary with correcting data from the Data Error Section of the disc.

BRIEF DESCRIPTION OF THE DRAWINGS

FIGS. 3a–3b illustrate cumulative recorded energy for a pit/slot $\lambda$ long in a conventional open loop system.

FIGS. 5a–5b illustrate laser read/write power to record an ideal slot of $\lambda$ length.

FIG. 11 is a schematic diagram of an optical recording disc of a type useable with the apparatus of FIGS. 10 and 11, showing a format for recording data on the disc according to the present invention.

FIGS. 12a–12d are idealized composite waveform diagrams, showing the recording of one pulse on an optical disc, and showing representative optical-disc recording and playback signal waveforms as a function of time.

FIGS. 14a–14b are waveform diagram similar to that of FIG. 13, but showing recordation of a longer pulse.

DETAILED DESCRIPTION OF THE INVENTION

The invention disclosed herein describes a method and apparatus for first accurately recording variable length pulses of analog data by optical means and secondly, if a datum cannot be recorded due to physical or chemical imperfections in the recording medium, then to detect and store the unrecordable addresses with respective data that was to be recorded therein for later insertion as appropriate and thereby eliminating all errors in an optical recording process.

The invention permits more accurate recording on an optical recording medium comprising conventional photo reactive and reflective layers by implementing means and processes for detecting transitional optically nonreflective, null inflection points on the deflecting, bending surface of a reflective layer which conventionally is caused to deflect or indent forming pits to record data. In a real time feed back circuit of the type described in the inventor's earlier patent cited above, detection of an instantaneous null inflection point will detect a pit indicative of optimal recording of a spike pulse of information, whereas detection of two sequential null inflection points will indicate an oblong pit or slot indicative of optimal recording of an elongated pulse of information. A slot is basically a continuous or extended pit of variable length depending on recording pulse length, the variation in length being determined by and proportionally related to the variable analog data to be recorded. The null inflection point is described as that point on the reflective surface at which sufficient deflection or pitting has occurred in the reflective surface to instantaneously change the surface from reflective or variably reflective to nonreflective as defined and vice versa.

Figure 1:
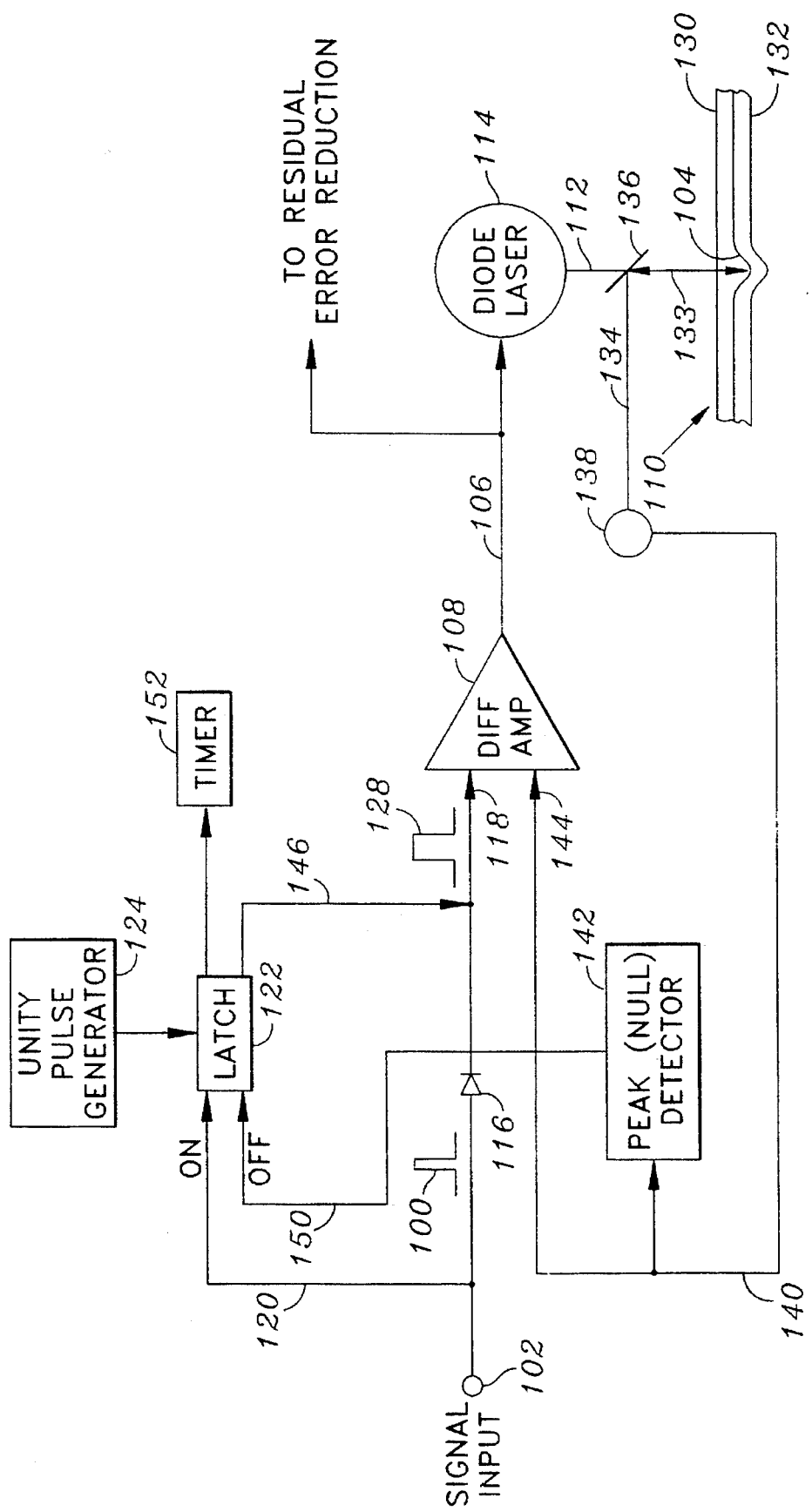
FIG. 1 is a block diagram illustrating the invention apparatus for accurate recording of analog data in discrete variable length pulses.

In FIG. 1, the laser analog recording circuit of this invention is shown. FIG. 1, essentially is a novel variation of the feedback circuit described in this inventor's earlier patent addressed in the background.

In FIG. 1, a unity pulse 100 of amplitude "one" and minimum duration such as a "spike" is fed to a signal input 102. When pulse 100 enters input 102, two results may occur: (1) the minimum duration of pulse 102 may be too short to produce a corresponding ideal spike pit 104; or (2) the minimum duration of pulse 102 may be too long to produce the corresponding ideal spike pit 104 but rather may cause an elongated pit or slot wherein an instantaneous null does not occur as with an ideal spike pit, but rather two sequential null inflections are indicated, one going reflective to nonreflective, and the other going from non reflective to reflective.

Since the first result above is undesirable in any recording situation, appropriate processes and circuitry have been provided in the invention as disclosed herein to eliminate the possibility of the first result occurring.

To prevent the first result above wherein pulses are too short to be recorded optically, an output 106, of a differential amplifier 108, must be held positive (high) long enough until pit 104 in an optical recording medium 110 is satisfactorily formed by a laser beam 112 emanating from a diode laser 114. Unity pulse 100 received on input signal terminal 102, is fed through a reverse current blocking diode 116 to a "command" input 118 of differential amplifier 108. Pulse 100 is concomitantly fed via an "on" latch lead 120 to a latch 122 and in so doing turns on latch 122. Latch 122 is continuously maintained "on" by a unity pulse generator 124, for the required period of time to allow laser diode 114 to power up and form pit 104. A latch output 146 applied to command input 118 of differential amplifier 108 thereby holds output 106 high long enough to drive laser diode 114 to form pit 104 by a broadened unity pulse 128. If unity pulse 100 is equal to or greater than corresponding latch broadened pulse 128, then pulse 128 will not be observed as being totally absorbed within pulse 100.

At the instant that unity pulse 100 rises, a photosensitive layer 130 of recording medium 110, initially at full reflectivity corresponding to "zero" level at a "demand" input 144 of differential amplifier 108, causes output 106 of differential amplifier 108 to deliver a maximum gain and power signal to diode laser 114, and a correspondingly proportional increased laser energy to optically active layer 130 and a reflective layer 132 of recording medium 110.

Laser energy is demanded by active layer 130 via a reflection 134 of laser beam 112, to a beam splitter 136, hence a photo diode 138 yielding a feedback lead 140 which is passed to a peak detector 142 and feedback demand input 144 of differential amplifier 108.

When photo diode 138 detects a null or zero reflectivity, it yields a peak positive signal on feedback lead 140, which indicates to amplifier 108 that pit 104 is satisfactorily formed. Under such condition, both command 118 and demand 144 inputs being high, differential amplifier 100 will show no difference therebetween and will yield a zero or low gain output 106 and thereby, effectively shutdown diode laser 114. Although pulse 100, being too short to properly record, would have preemptorily returned to zero and thereby prevented a satisfactory pit formation to yield a null, latch 122 remains on and sustains unity pulse 100 until a satisfactory pit is formed. On proper pit formation, demand input 144 is now high, due to zero-reflectivity received by photo diode 138. Peak detector 142, likewise receiving a high from feedback lead 140, then releases latch 122 via a latch release "off" lead 146. During the interval in which unity pulse 100 is at zero and latch 122 maintains broadened pulse 128 at command input 118, diode 116 blocks broadened pulse 128 from being fed back to input terminal 102. The total period during which latch 122 was on is measured and stored by a timer 152.

Figure 2A:
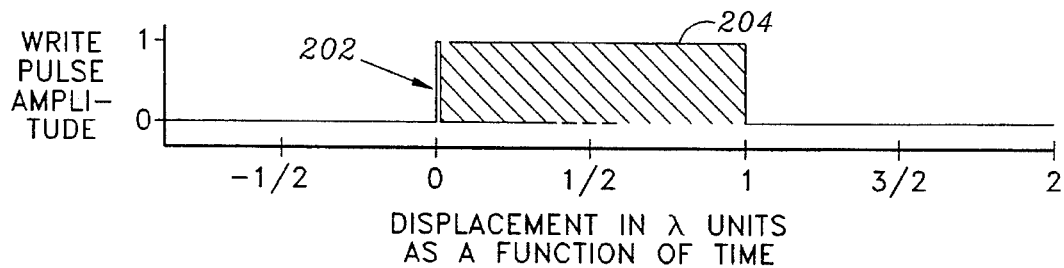
FIGS. 2a–2c illustrate a laser energy distribution on a photosensitive surface for a spike pulse and for a pulse one wavelength ($\lambda$) long during writing along an optical path.
Figure 2B:
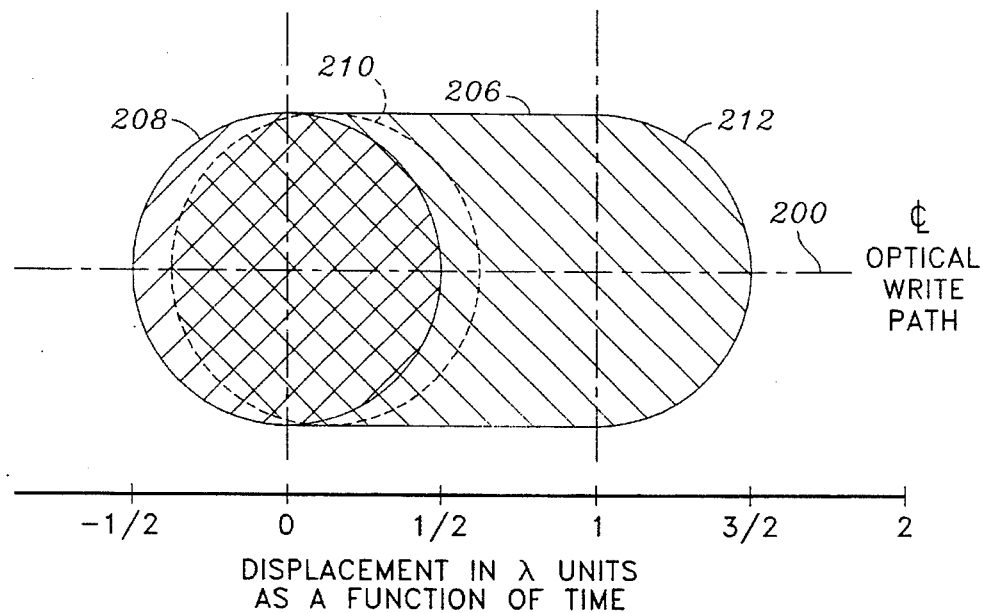

FIGS. 2(a), (b), (c), illustrate a displacement in λ units as a function of time indicating laser energy and beam distribution on a photo sensitive surface for a pulse λ long during writing along an optical recording path 200. FIG. 2(a) illustrates an electronic spike, pulse 202 and write pulse 204, of amplitude "1" and length "λ", the wavelength of the laser utilized. FIG. 2(b) illustrates the corresponding track 206 of the overlapping focus of the laser beam initial circle 208, on the optically active surface and subsequent tracking circle 210, to the terminal end circle 212. During the travel of initial focus circle 208 to terminal focus circle 212, the cross hatched area therein exposed to the laser beam incurs overlapping and therefore cumulative and excessive exposure to the irradiating laser beam which tends to increase without bound, yielding uncontrolled and undesirable physical and chemical reactivity of the photo reactive layer.

Figure 2C:
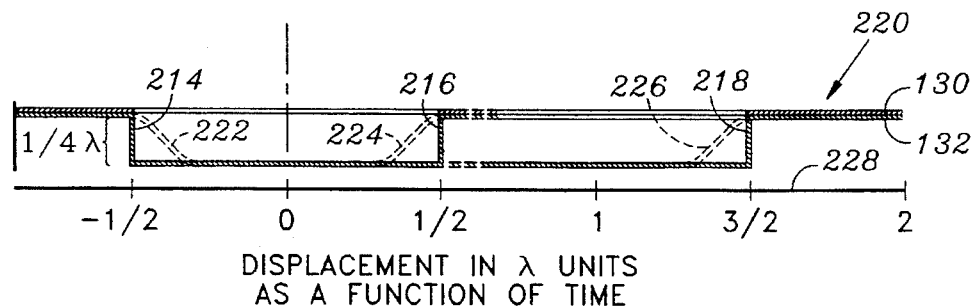

FIG. 2(c) illustrates a sectional side view of the optical recording medium comprising photoreactive layer 130 and reflecting layer 132 in which the foregoing pulse is recorded. FIG. 2(c) is an ideal recording depiction of a pulse recorded by deflection, indentation of reflective layer 132, at an approximate depth of ¼ λ at edges 214 and 216 for a spike pulse 202 or at edges 214 and 218 for a pulse λ long.

Again the illustration in FIG. 2(c) depicts an ideal "sharp end" pit or slot with sides 214, 216 and 218 being vertical and sharply distinguishable from the surrounding nonrecorded level 220. In actuality, however, the edges are not abrupt and sharply defined but are curved and shaped as in dashed lines 222, 224 and 226.

It should be noted that FIGS. 2(a), (b) and (c) share the same common displacement/time frame abscissa 228. In so noting, it should be apparent that although the electronic pulse time lapse of FIG. 2(a) is one wavelength (λ) in duration, the same pulse recorded on the recording medium in FIG. 2(c) is actually two wavelengths (2λ) in displacement. Referring now to FIGS. 3(a) and (b), the foregoing electronic analysis and explanation of the recording process is expanded upon to consider the optical aspect of the recording process. FIG. 3(a) is a graph illustrating laser power vs. recording medium displacement and FIG. 3(b) is a graph depicting integrated recorded laser energy vs. medium displacement. The abscissa 302, common to both graphs, is proportional to displacement of a moving point on photosensitive layer 130 of FIG. 1 as a function of multiple wavelengths of the laser wavelength at that point on medium 110. Since displacement (d) is velocity (v) times time (t), d=vt, the abscissa may also be interpreted as time. Zero (0) on common abscissa 302 of FIG. 3(b) represents the beginning of spike pulse 100. Negative quantities on common abscissa 302, represent displacement or lapsed time before the beginning and positive quantities after the beginning of spike pulse 100. The ordinate of FIG. 3(b) describes optical power level proportional to nominal laser output, at the recording point on photosensitive layer 130. The 100% nominal power output 304 in FIG. 3(b), of the laser graph represents the peak power available. The cumulative, excess energy is indicated in shaded area 306.

Before the instant spike pulse 100 rises at displacement zero (0), illustrated in FIG. 3(*a*), it is preceded by the normal maximum reflectivity of a read or write laser beam indicated in FIG. 3(*b*) inherent in the unrecorded portion of the optical path, corresponding to a zero (0) signal fed into the system. Normal read level is considered to be approximately 10% of normal write level. At the instant that unity signal 100 is fed into the system, the optical power output 304 reaches 100%, heats energy absorbing reactive layer 130 to its temperature of reaction or decomposition and then begins to cause deflection indentation of reflective layer 132 such that the phase of the light returned through path 133 and 134 is reduced proportionally.

Figure 4A:
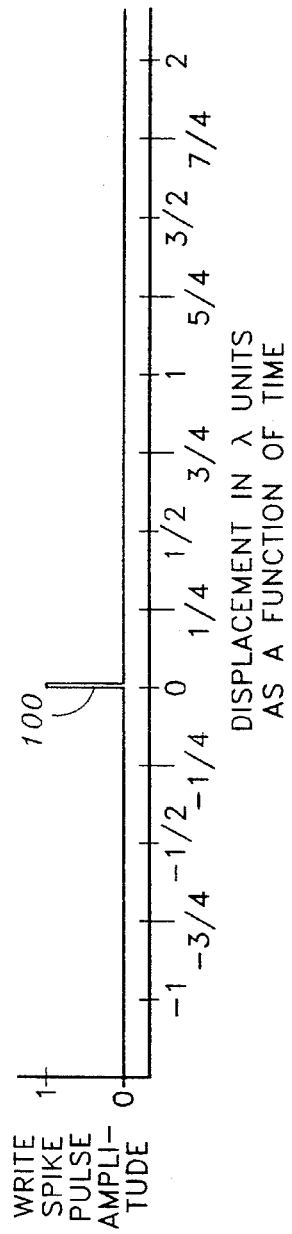
FIGS. 4a–4b illustrates laser read/write power to record an ideal circular pit of minimum length.
Figure 4B:
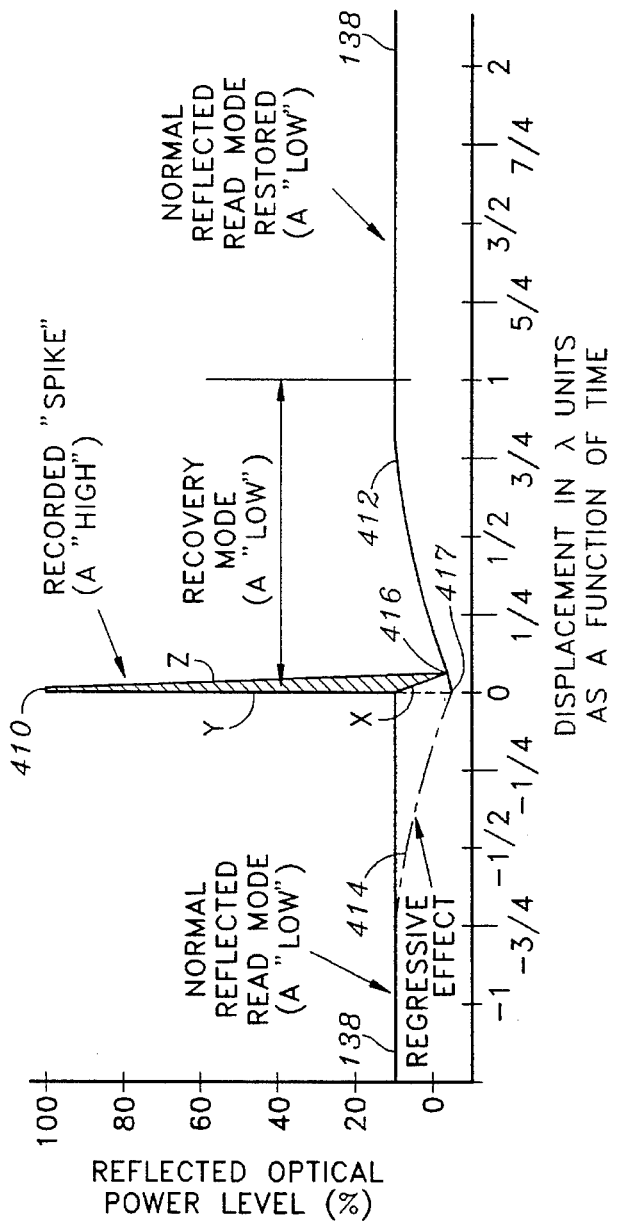

Referring now to FIGS. 4(*a*) and (*b*), another view is presented in recording an optical spike pulse. FIG. 4(*a*) depicts electrical write pulse amplitude vs. displacement or time and FIG. 4(*b*) describes the respective relationship of optical or laser power vs. displacement or time. As illustrated in FIG. 4(*b*), the optical path of a read-write-read laser beam as it moves positively in displacement and time along the path will confine total laser energy within a triangular area 410, bounded by sides x, y and z, has been such as to complete the reduced reflection of beam 133/134 by forming pit 416. The right half 412 of the recording path is symmetrical with the left half 414 and represents the recovery interval of approximately one wavelength during which further pulse recording capability is fully or partially inhibited. Inhibition of subsequent pulses is necessary due to the low but rising reflectivity of the right edge 412, of pit 416, when read by the beam of diameter approximately the same as that of the pit. This lower state of reflection along right edge 412, produces a proportionally low level of laser beam power, as dictated by feedback lead 140 to demand input 144 of laser driver 108 of FIG. 1.

Referring again to FIG. 1, in a second case, signal input 102 offers a spike pulse 100 which is too long, and which therefore shifts a reflectivity null at pit 104 incorrectly, if long spike 100 is longer than an ideal spike pulse but shorter than a long slot-writing pulse. Under such conditions, zero-reflectivity, peak detector 142, having detected that the desired minium state of reflectivity has been achieved, will send an "off" signal 150 to latch 122 and temporarily suspend incoming pulse 128.

By such means the invention uniquely controls the energy required to form a pit or indentation in the recording medium relative to a spike pulse. The pit so recorded has inherent optimum reproducible characteristics, and is properly located in terms of displacement as a function of time over a broad range of photosensitive layer characteristics.

If analog as well as digital data is to be recorded by similar means, it is necessary to record variable length pulses in addition to spike pulses. This is accomplished by forming variable length slots in the recording medium. A slot in recording medium 110 is considered to be a prolonged pit of accurate length and at least one wavelength ($\lambda$) in displacement or length.

Referring now to FIGS. 5(*a*) and (*b*), the process of recording a slot pulse 500 is initiated by forming pit indentation 416. As indicated in FIG. 4, the center of pit 416 in FIG. 5 is slightly displaced from zero displacement at 417, as a function of time because a finite period of time is required to achieve zero reflection from reflective layer 132 due to the chemical and physical reaction of photo-sensitive layer 130.

Slot 500 is initiated by the leading edge of a write pulse 502 of FIG. 5(*a*), which forms pit 416. Again, this process is similar to that of FIG. 4, arbitrarily chosen as one wavelength long between the inflection points 416 and 518 to conform with other figures. Nevertheless, slot 500 could be somewhat shorter, depending upon the characteristics of the photosensitive medium, but indefinitely longer. A similar curve of reduced scale is shown, from the inflection point 416 and onward, together with a phantom curve 502, in order to demonstrate that in this invention, the system is reading at all times both in the read mode 504 and 506, and during the write mode 500.

Curve 502 is a phantom curve representing the power reflected from pit 416, already formed, not at the nominal 10% read power, but at the peak 100% laser power of the light source under the hypothesis that data cannot be recorded. This hypothesis is necessary to understand the significance of the characteristics of the photosensitive material employed.

The characteristics of photosensitive material in the layer or stratum 130, employed are: (1) The material responds to electromagnetic energy in the form of photons; (2) the photons may lie in the spectrum between the deep infrared and the far ultraviolet; (3) the material may be metallic, organometallic or organic; (4) the material may respond to photonic energy by physical or chemical change or a combination thereof; (5) such change will produce a reduction of laser reflection; (6) for change to occur, the material must be heated by photonic energy to a temperature above the ambient such that the physical or chemical or combination change thereof in optical properties begins to occur, said transition temperature which may be abrupt or gradual is called a "threshold"; and (7) above the transitional temperature, the physical or chemical change in the photoreactive layer is proportional to the incremental photonic energy received by the material, which will be interpreted as sensitivity.

In the preferred embodiment of the invention, the optical change in reflectivity is brought about by the phase contrast caused by deflection, indenting, or pitting of a coating of reflective material affixed to the photosensitive layer. The photosensitive material used in the preferred embodiment is an organic dye sensitive to the wavelength of the light source used normally available from a laser diode. Referring again to FIGS. 5(*a*) and (*b*), the complete process of recording a slot optimally will be more clearly delineated. As the optical beam 112 (FIG. 1) at 10% power in the read mode 504, moves with respect to the recordable medium 130, the leading edge 508 of a slot-producing pulse 510 of FIG. 5(*a*), rises at zero displacement. The optical beam in FIG. 5(*b*), responds instantaneously to peak power (100%). For a short threshold interval 512, the beam power remains at peak power until the threshold temperature of the photosensitive dye layer is reached. After the threshold interval 512, the chemical decomposition of the dye commences, causing the reflective layer to commence deflecting, indenting proportionally at 514, which deflection in turn causes a proportional and varying drop in beam power brought about by the feedback electronic circuit described earlier, slaved to this process. Upon reaching a certain point of deflection or indentation, a reflective "null" point 416 is reached by the reflective layer at which minimum reflectivity is attained. A pit at null point 416 is thereby created with one wavelength positive displacement and one wavelength negative displacement due to a regressive effect caused by the finite diameter of the laser beam. Capability of the invention process to complete the rest of slot 500 is controlled by a variation in laser power indicated by increasing laser power reflection curve 502. Curve 502 begins at zero-reflectivity at null point 416, which is displaced from zero (0) displacement by a variable reflection interval 417.

Curve 502 rises upward as laser reflectivity increases and arrives at a pseudo-restoration of 100% reflective power at a full wavelength displacement 516, plus a pulse drop delay interval 520 equal in duration to that of variable reflection interval 417. Delay interval 518 is encountered when the one-wavelength long slot-forming pulse 510 returns to zero (0) at 522. Beginning at null point 416 and rising to some point to be determined, the optical beam is initially turned completely off due to the feedback circuit tending to avoid excessive energy. An important aspect of the invention process is the fact that the optical beam is turned back on proportionally with the displacement until a predetermined point is reached. That point is determined by the threshold temperature of the photosensitive layer below which recording cannot take place. The threshold temperature is a property of the photosensitivity of the reactive layer and may be chosen in the preparation of the photo sensitive material. The threshold temperature is primarily a function of the specific heat of the photo sensitive compound used, the wavelength of the light source used, and the exothermic or endothermic additives used to moderate the specific heat.

Figure 6:
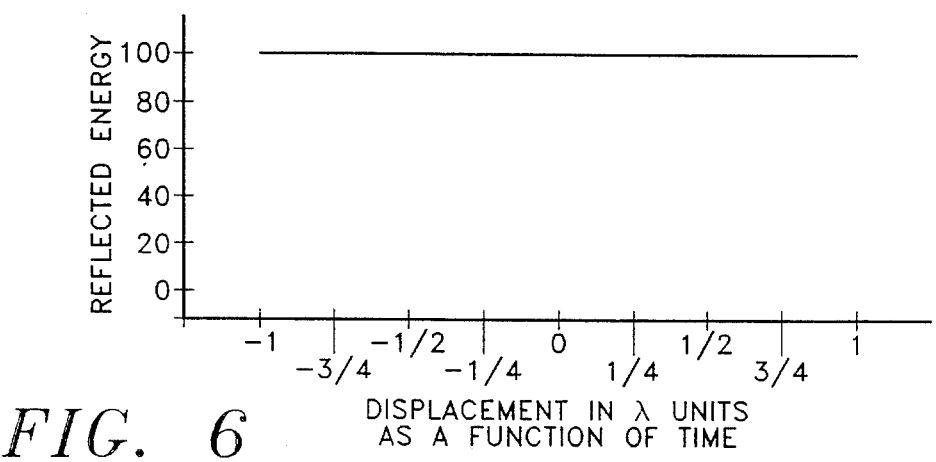
FIG. 6 illustrates optical reflection from an optical recording surface indicating a series of perfectly recorded zeroes.
Figure 7:
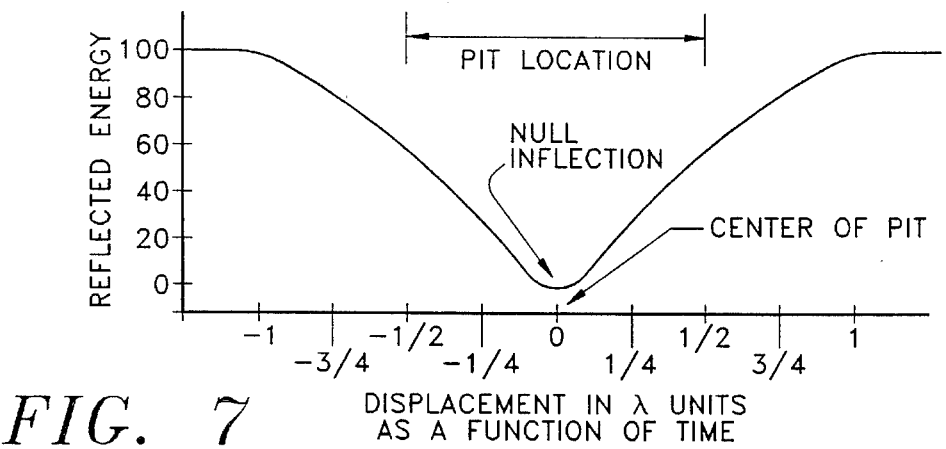
FIG. 7 illustrates optical reflection of an ideally recorded, single, one wavelength ($\lambda$) diameter pit indicating a spike pulse of analog data.
Figure 8:
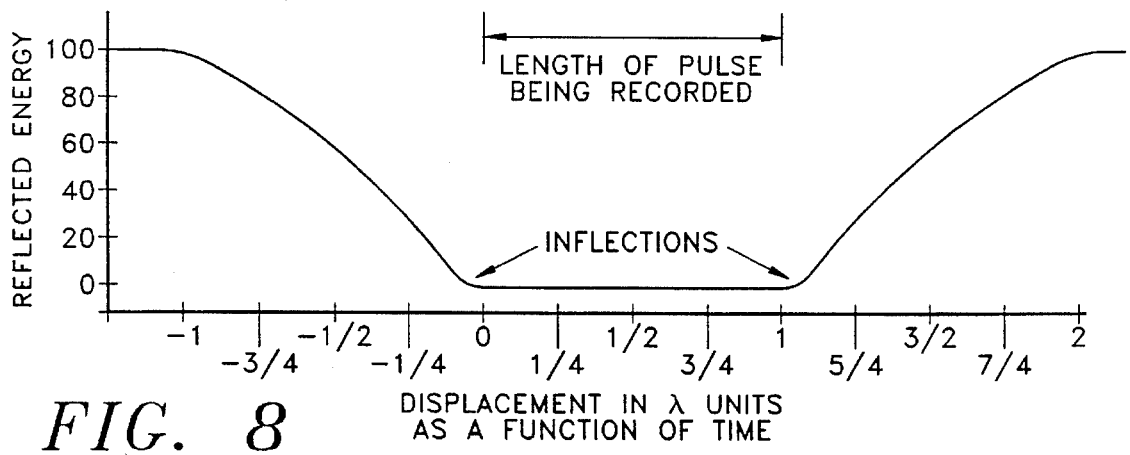
FIG. 8 illustrates optical reflection of an ideally recorded two wavelength ($2\lambda$) slot indicating a lengthy pulse of analog data.

FIGS. 6, 7 and 8, are provided to graphically illustrate optical reflection of a read beam across recorded data. FIG. 6 indicates a straight line, 100% reflection for a series of perfectly recorded zeroes where no reflective layer deflection occurs. FIG. 7 describes optical reflection of single, perfectly recorded, one wavelength diameter laser beam, i.e. a spike pulse indicated by a single instantaneous null reflection.

FIG. 8, indicates a single perfectly recorded pit of 2λ wavelength, i.e. a slot indicated by two null inflection points.

It should be understood that the analysis throughout this description, assumed for clarity and simplicity of explanation, that optical beam 112 was of uniform power density and would cause pits of cylindrical shape. In reality, however, though coherent a laser beam is not of uniform power density across its diameter. The laser beam normally approximates a $TEM_{00}$ mode, which is a Gaussian distribution in form along the optical path of photo sensitive layer 130.

A normal Gaussian distribution may be described as:

$$Y = ke^{-(x-x_0)\frac{2}{2\delta^2}}$$

$$Y = \frac{1}{\delta(2\pi)^{1/2}}$$

and δ= Standard Deviation

If the interval between $(x_0-\delta)$ and $(X_0+\delta)$ is equal to one wavelength of the laser diode, i.e. the diffraction limited circumstances for optical recording, then deflection of reflective layer 132, for a spike pulse will approximate the shape of a curved pit.

The bottom of the pit, formerly assumed to be a flat circle, will be spherically rounded. Due to the curved geometry of the pit, the optical effect of scattering tends to replace the conventional phenomenon of phase contrast or destructive interference due to ½λ difference in incoming beam and reflected beam from bottom of a pit ¼λ deep.

Referring now to FIGS. 9 through 16, the novel method and apparatus for residual error reduction in an optical recording process is shown.

Figure 9:
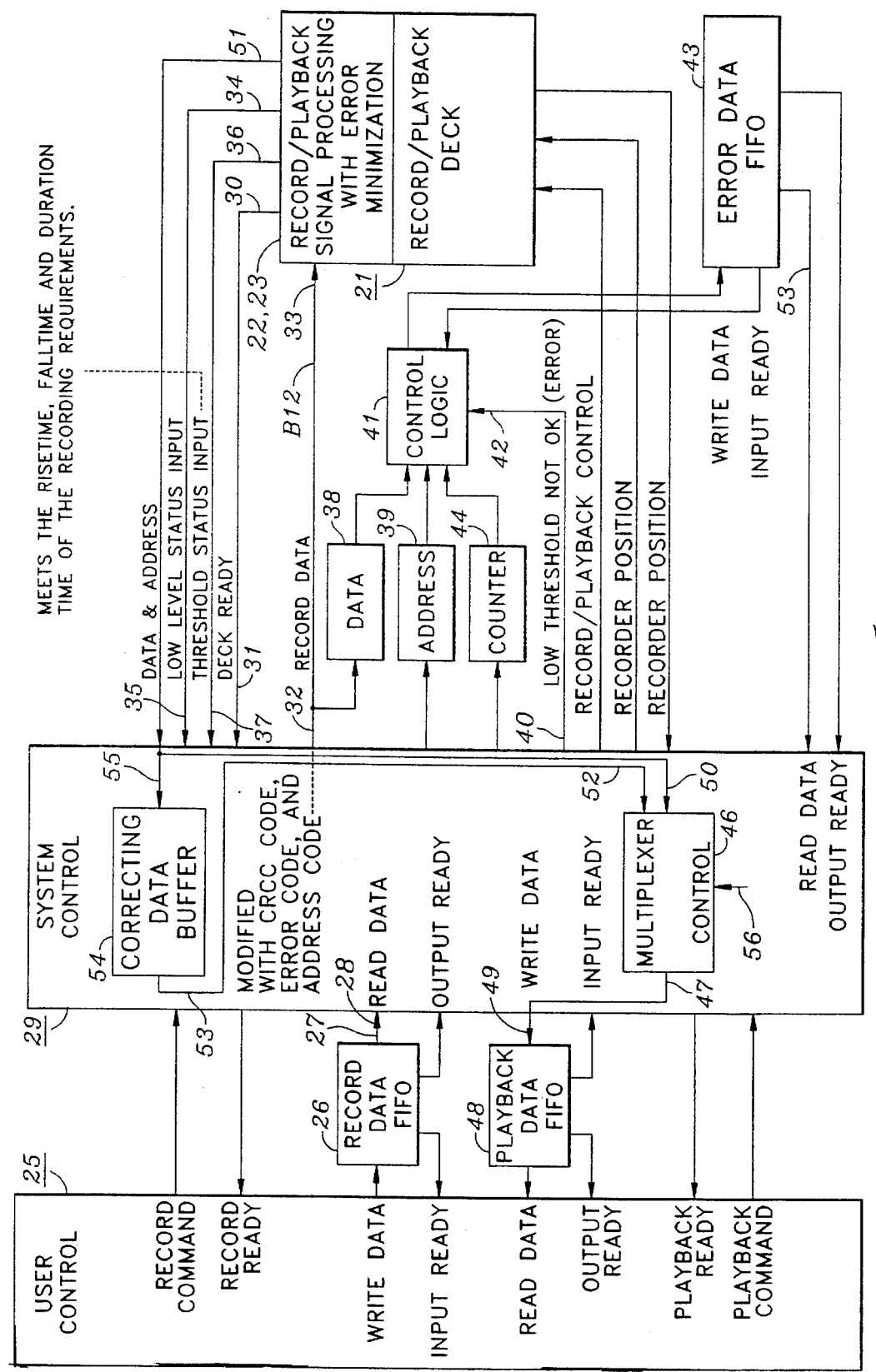
FIG. 9 is a block diagram of the novel apparatus for reducing optical recording errors according to the present invention.
Figure 10:
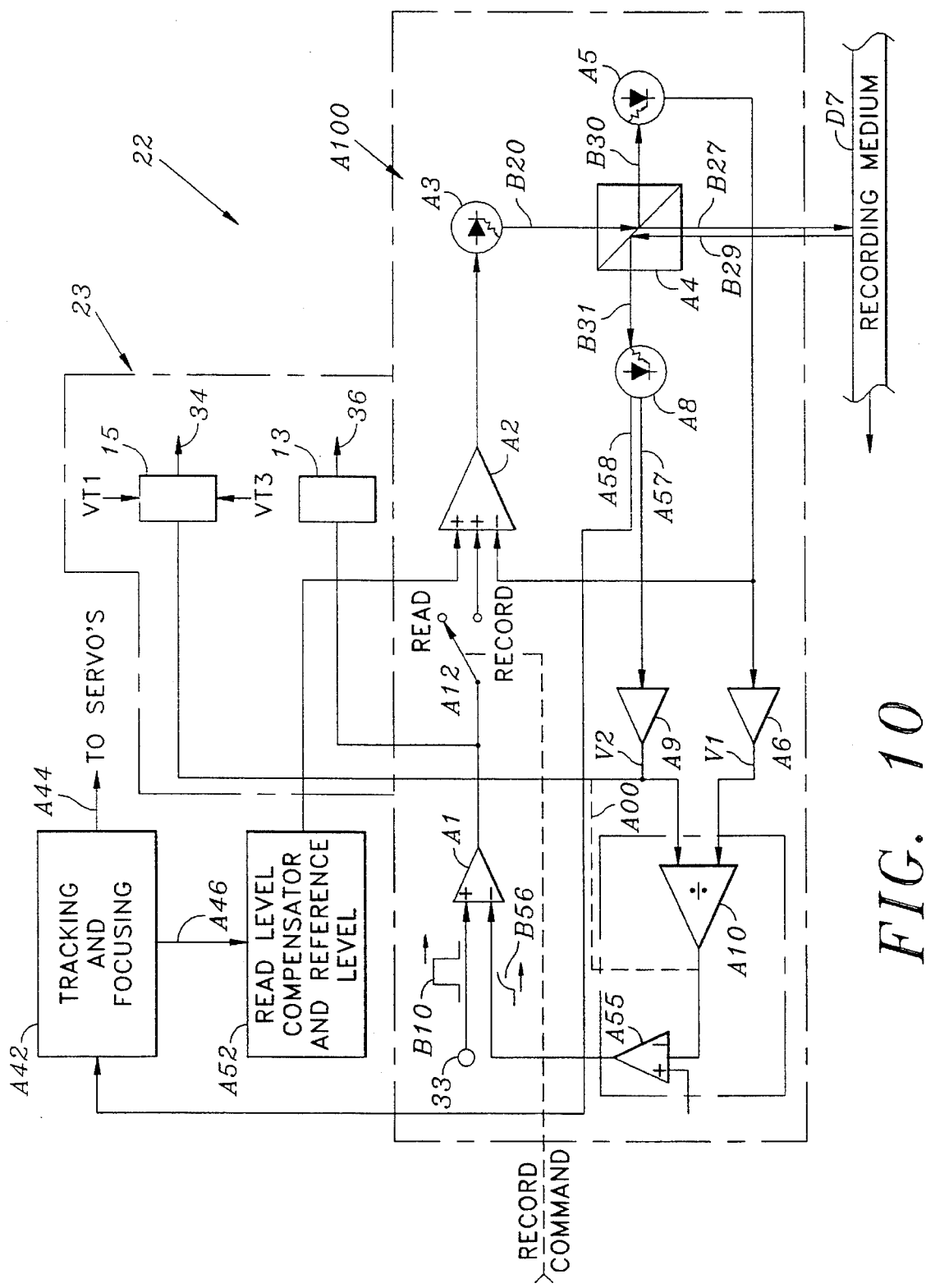
FIG. 10 is a schematic diagram of recording error detection elements forming part of the apparatus of FIG. 9, showing those elements connected to the present inventors' prior disclosed error minimization system.

As shown in FIG. 9, the error reduction apparatus 20 according to the present invention includes a number of functional blocks operatively interconnected with a Record/Playback Deck 21. Record/Playback Deck 21 includes signal processing means 22, as shown in FIG. 10. Signal processor 22 contains means for monitoring an optical recording medium during the process of recording, as will be explained in detail below. Error detection means 23 forming part of the present invention is shown in FIG. 10, connected to signal processor 22. Signal processor 22 includes a novel closed loop error minimization system (A100) previously disclosed by the present inventors. However, it will become apparent to those skilled in the art in following the ensuing description that the residual error reduction system and apparatus disclosed herein may use other error detection means and need not be interconnected with the previously disclosed error minimization system.

Referring now to FIGS. 9 and 10, error detection means 23 forming part of error reduction apparatus 20 are shown operatively interconnected to the Signal Processing Portion 22 of a Record/Playback Deck 21. As depicted in FIG. 10 and described below, the optical recording/playback system of FIGS. 9 and 10 is of the type used with optical discs having a reflective metallic coating overlaid by a photosensitive or photo-reactive, initially transparent layer. In those locations on the disc which are as yet unrecorded, or on which no data elements are recorded, the disc remains highly reflective. Locations on the disc at which data elements are recorded have reduced reflectivity, owing to the deformation or other physical or chemical alteration of the photosensitive layer or underlying reflective substratum. Those skilled in the art will understand that the novel method and apparatus described herein would be useful with systems which utilize an optical recording disc having no reflective layer, which discs are read by a light beam transmitted through the disc.

Referring to FIG. 10, alteration of the photo-sensitive layer overlaying the reflective layer of an optical disc is usually effected by irradiating the disc with a laser beam B27. The radiant power level incident upon the disc is modulated from a low, quiescent power level used for reading the data on the disc to higher power levels, sufficient to alter the photo-reactive layer, when recording data elements.

The recording system of FIG. 10 employs an error minimization system (A100) in which the reflectivity of a spot on the disc (D7) being irradiated by a laser (A3) is continuously monitored by a photo detector (A8). The output of photo detector (A8), which is inversely proportional to the reduction in reflectivity accomplished by irradiating the spot at a sufficiently high power level to record a pulse is amplified by an amplifier (A9).

The amplified photo-detector signal at the output terminal of (A9) is normalized in a divider circuit (A10) by dividing it by a second photo-detector (A5) signal amplified by amplifier (A6), which latter signal is proportional to radiant power incident on the recording surface. The output of normalizer (A10) is subtracted via differential amplifier (A55) from a constant voltage level, and input to the inverting input of a differential amplifier (A1).

A signal to be recorded, is input into a non-inverting input terminal 33 of differential amplifier (A1). Thus, the output signal from the differential amplifier constitutes an error signal which is proportional to the difference between a desired reflectivity reduction and the instantaneous actual reduction in reflectivity of the recording disc. This error is input to a power amplifier (A2) which drives laser (A3).

The elements of the novel system A100 described above comprise a closed-loop servo system that controls the intensity of the laser beam which irradiates a recording surface. Closed loop control of laser beam intensity compensates for variations in reflectivity of the reflective layer on the recording disc, and for variations in transmissivity and sensitivity of the photo-reactive layer. This compensation causes the reflectivity of a recorded pulse to fall within a substantially narrower tolerance range than could be achieved with prior art, open-loop recording systems. Therefore, the system previously disclosed by the present inventors experiences substantially fewer recording errors than prior art systems. However, certain gross physical or chemical anomalies may exist in the surface or grooves of an optical disc to be recorded which are beyond the capabilities of the prior-disclosed error minimization system to compensate for, resulting in some residual recording errors. The present invention, as disclosed below, is intended to provide a method and apparatus for reducing these residual errors.

Figure 13A:
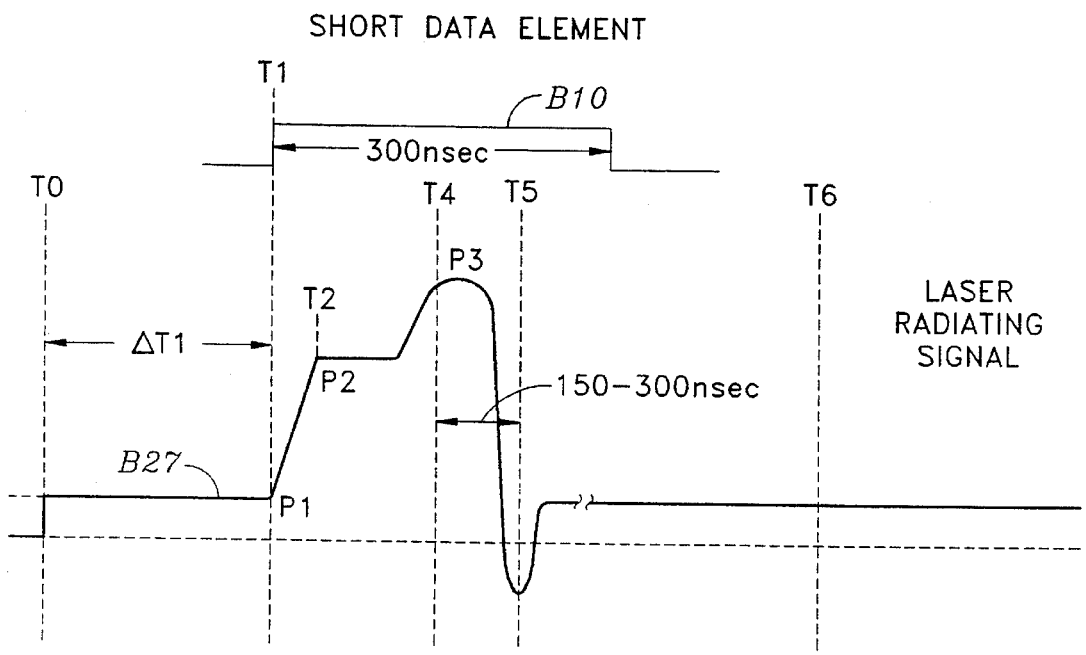
FIGS. 13a–13b are waveform diagram showing the power level of a recording laser, and the resulting change in transmissibility of an optical medium, during recording of a pulse followed by a no pulse.
Figure 13B:
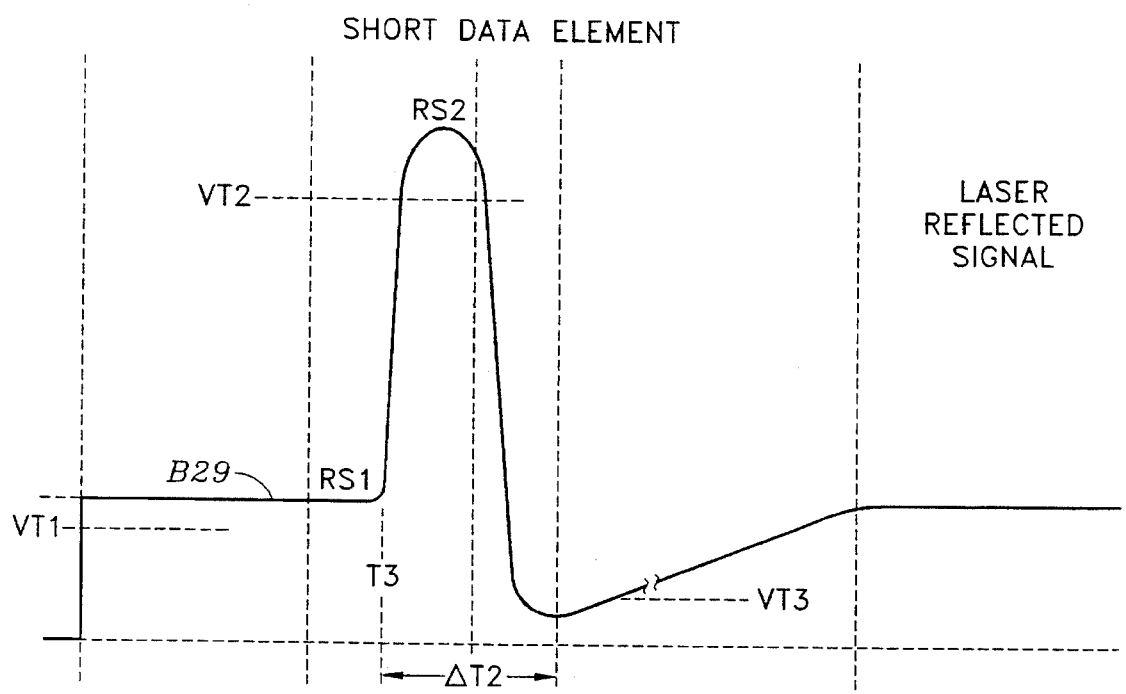

FIGS. 12, 13 and 14 illustrate idealized waveforms of laser recording power (upper graphs) and of energy reflected from the surface of an optical recording disc (lower graphs) of the type which might be encountered in the closed loop error minimization system A100 depicted in FIG. 10. Referring in particular to FIG. 13, waveforms associated with recording a data element (a pulse) followed by no pulse are depicted. As shown in FIG. 13(a), laser A3 of FIG. 10 is energized to allow, read power level P1 at time T0. At this time, the signal B29 (FIG. 10) reflected from an optical disc (D7) would be expected to cause the output voltage V2, indicated in of FIG. 13(b), at the output of amplifier A9 to exceed a pre-determined threshold value VT1, for those locations of a previously unrecorded optical disc of sufficient reflectivity to be useable. The output terminal of amplifier A9 is connected to the input terminal of a comparator 15, referred to as a Digital Recorded Data Threshold Comparator. For input voltages greater than VT1, comparator 15 outputs a logic "zero" level, signifying that a logic "zero" level is being read from the disc.

Referring again to FIG. 13(a), the output power of laser A3 is increased to a higher, record level P2 over the interval T1 to T2, in response to a command B10 to write a pulse/data element at T1. Thus, after a delay period (T3–T1), the signal B29 (FIG. 10) reflected from the optical recording disc would be expected to rise along with the incident laser power. Therefore, the error signal at the output terminal of differential amplifier A1 would also be expected to rise. The output terminal of differential amplifier A1 is connected to the input terminal of a second comparator 13, referred to as a Spike Detector Comparator. For input voltages greater than a predetermined threshold voltage VT2, comparator 13 outputs a maximum signal level, signifying that the recording surface is initially responding properly to the recordation of a data element by generating a "spike" error signal, i.e., an error signal of a relatively short period. If a data element is being successfully recorded, the error signal at the output terminal of differential amplifier A1 should begin to decrease as the reflectivity of the photo-reactive surface is reduced by the action of the recording laser. Thus, at some time T4 or later, the output of spike comparator should attain a quiescent, minimum level.

At time T5, the reflectivity of a location on the surface of an optical disc on which a data element has just been recorded will remain at a low value, resulting in a voltage below a threshold value VT3 at the input terminal of comparator 15. Thus, at this time, the output of comparator 15 will be high if a "high" has been successfully recorded on the disc.

At a location on the optical disc on which a short pulse or data element (FIG. 13), or a lengthy pulse or data element (FIG. 14), has been recorded moves away from the laser and photo-sensor (A8), the output voltage of amplifier A9 will rise above threshold VT3, as shown in the lower graph of FIG. 13(b). When this occurs, the output of comparator 15 will change to a low level.

It should be apparent to the reader that while FIG. 13 may be likened to or utilized in a conventional manner for digital data recording techniques, FIG. 14, on the other hand, graphically illustrates applicability of the invention process and apparatus to wide band analog recording applications wherein a variable length pulse or recorded data element may be utilized, which pulse length accuracy is enabled by the close circuit feedback recording technology in combination with the instantaneous error detection and elimination processes disclosed herein.

Figure 15A:
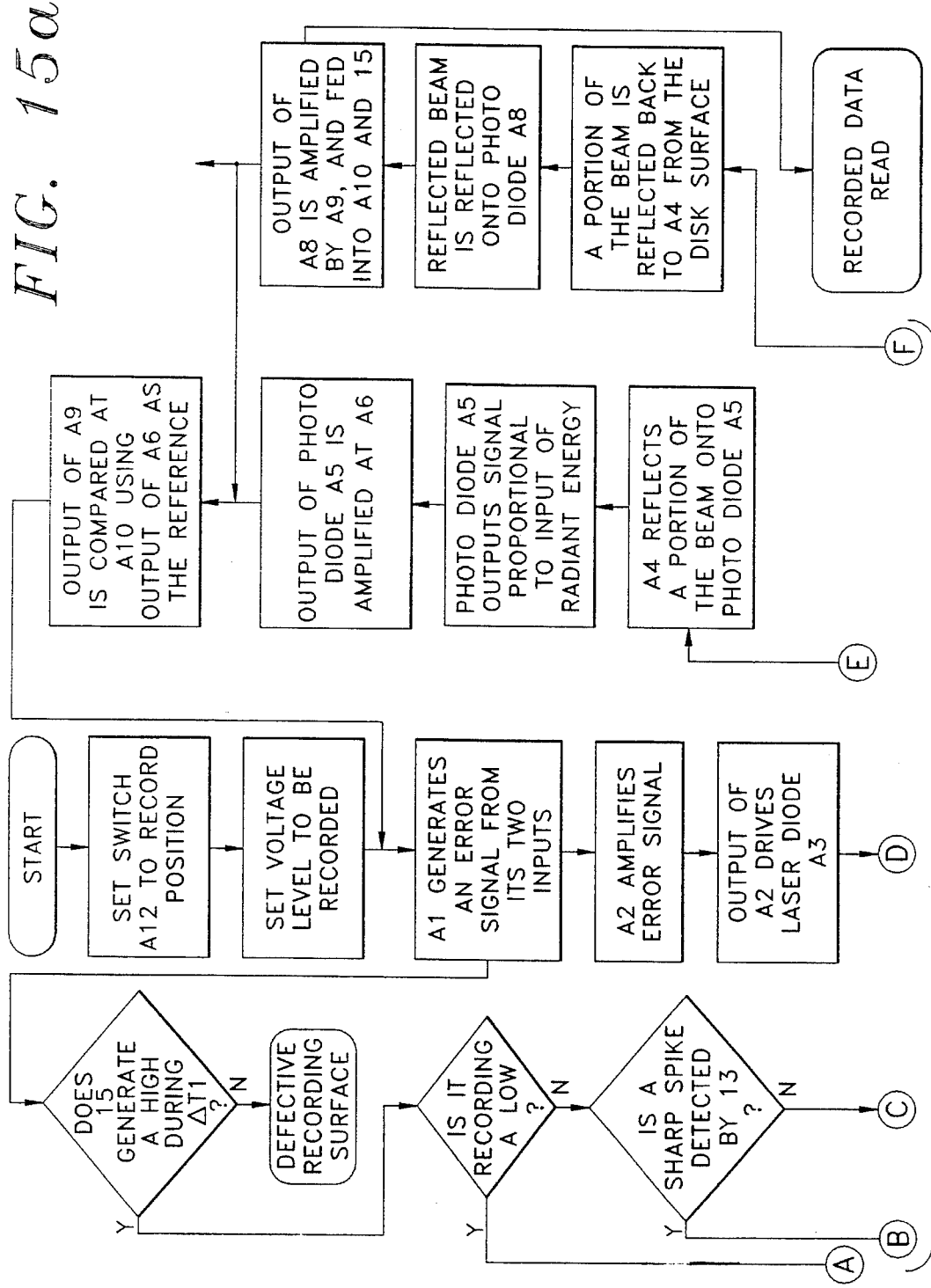
FIGS. 15a–15b comprise a flow chart of basic recording error detection operations performed in the error reduction method and apparatus according to the present invention.
Figure 15B:
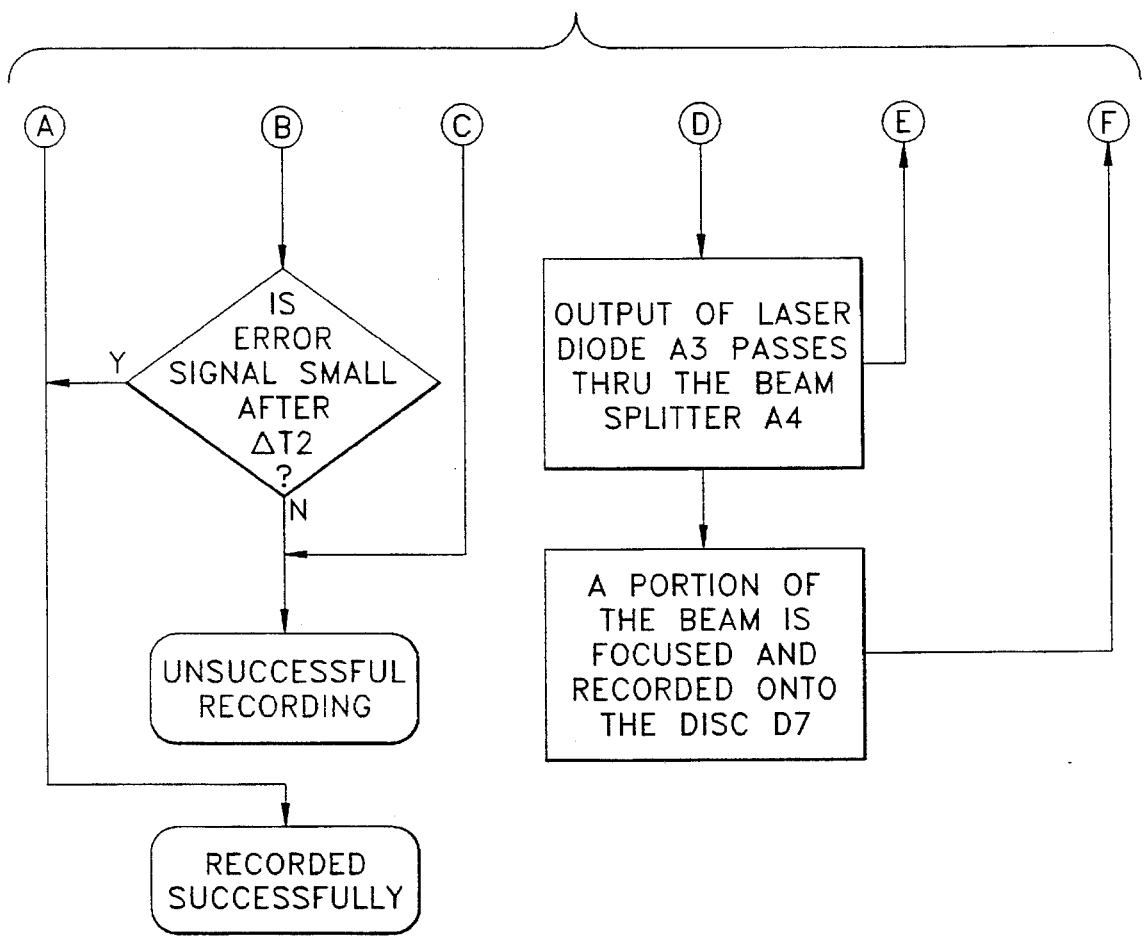

The sequence of the operations of comparators 13 and 15 of FIG. 10 in detecting recording errors, as utilized in conjunction with the closed loop optical recording system of FIG. 10, is illustrated in the flow charts of FIGS. 15(a) and 15(b). That operation is summarized as follows:

1. A recording surface is irradiated (FIG. 13(a)) with a low, read, laser power level P1 (B27), insufficient to alter the photo-reactive layer of the recording surface. At time T0, the signal reflected (FIG. 13(b)) indicating a voltage level RS1 (B29 from the recording surface to photo-detector A8 and amplified by amplifier A9 is checked by operation of comparator 15, if this signal is above a threshold voltage level VT1, a suitable recordable medium is deemed to be present, and the test is passed.

2. (a) At time T1, if a low level data element is to be recorded, the laser power level remains at read level, P1. If the reflected signal (RS) remains at a level RS1 above VT1 throughout the duration of a low level data element, it is inferred that a data element has been successfully recorded.

(b) If a high level data element is to be recorded, the laser power level is increased from a quiescent, read level P1 to an initial high recording level P2. Because of the finite response time of the circuitry of the laser, the increase of laser power from P1 to P2 takes until time T2 to be accomplished. Owing to the response time of the photo-detector A8 and associated circuitry, it takes until time T3 for the amplified reflected signal from the recording medium to begin to increase from RS1 to RS2. As the reflected signal (RS) increases, the error signal of the servo loop controlling the laser power level increases, causing the laser power level to increase to a maximum recording level of P3. Between time T3 and T4, the error signal is monitored by comparator 13 to verify that it is above a predetermined threshold value VT2 (FIG. 13(b)).

3. Irradiating the recording surface alters its photo-reactive layer, decreasing the reflectivity of the surface. Since the laser power level is controlled by a closed loop servo, the laser power level decreases to a minimum at the end of a pulse recording interval T5, provided that the pulse is successfully recorded.

4. Shortly after T5, the laser power level is returned to read level P1, and reflected signal (RS) monitored by comparator 15 to verify that the reflected signal is below a threshold value VT3, verifying that a pulse has been recorded.

As shown in FIG. 10, the input terminal of Digital Recorded Data Threshold Comparator 15 is connected to the output of amplifier A9, and is therefore proportional to the laser signal B29 reflected from the recording surface of optical disk D7 onto photo-diode A8. Optionally, the input terminal of comparator 15 may be connected to the output terminal of normalizer A10, as shown by the dashed line (A00) in FIG. 10. In the latter case, the dynamic range of signals is desirably reduced as compared to the dynamic range of signals at the output of amplifier A9.

The action of comparators 13 and 15 as described above provides a continuous real-time verification that the surface of an optical recording disc is sufficiently reflective to represent a minimum level data element and that maximum level data elements are properly recorded on the surface. If any of the verification tests indicates a recording error, the error reduction apparatus of FIG. 9 will compensate for those errors, as will now be described.

RECORD MODE

Referring again to FIGS. 9 and 10, error reduction system 20 is first placed in the record mode by means of switch A12 (FIG. 10). Selection of the record mode is controlled by a User Control Module 25 (FIG. 9). Data to be recorded on an optical disc D7 (FIGS. 10 and 11) is input from user Control Module 25 to a first memory means, preferably a serial shift register 26, configured as a first-in-first-out (FIFO) register. FIFO 26 is referred to as a Record Data FIFO.

A data output terminal 27 of Record Data FIFO 26 is connected to a data input terminal 28 of a System Control Module 29. System Control Module 29 provides interfacing, control and temporary memory storage functions for interfacing User Control Module 25 with Record/Playback Deck 21, and other elements of error reduction system 20 to be described. Those skilled in the art will recognize that the functions of System Control Module 29, which functions are defined in detail below, may be performed by a general purpose computer, hard-wired logic elements, or, preferably, a microprocessor. Those alternate implementations are also useable for other components of the apparatus 20. Record/Playback Deck 21 has a Deck Ready output status terminal 30 connected to a Deck Ready status input terminal 31 of System Control Module 29. System Control Module 29 responds to a logic true state of Deck Ready input terminal 31 in outputting a sequence of data to be recorded on optical disc D7. Raw data to be recorded is output from Record Data FIFO 26 to System Control Module 29. Here the raw data is formatted by System Control Module 29 to contain an error code typically a Circular Redundant Correction Code (CRCC), and addresses where the data is to be written on optical disc D7. Thus formatted, data is output on a Record Data output terminal 32 of System Control Module 29, which Record Data output terminal is connected to Data Input terminal 33 of Record/Playback Deck 21. Record/Playback Deck 21 records the data input to its data input terminal 33 on an optical disc D7, as shown in FIG. 11. This data is recorded in an annular location on disc D7 referred to as a Data File Section D34.

As shown in FIG. 9, the output of Data Comparator 15 (FIG. 10), is connected to an output terminal 34 of Record/Playback Deck 21, which output terminal is connected to a corresponding status input terminal 35 of System Control Module 29. Also, the output of Spike Comparator 13 (FIG. 10), is connected to an output terminal 36 of Record/Playback Deck 21, which output terminal is connected to a corresponding status input terminal 37 of System Control Module 29.

Control logic within System Control Module 29 monitors the state of status input terminals 35 and 37. If no recording errors are detected, recording of a complete data file on optical disc D7 proceeds conventionally.

However, if a recording error is detected during the recording process, the error reduction apparatus 20 according to the present invention compensates for any such recording errors, as will now be described.

As shown in FIG. 9, data output on Record Data output terminal 32 of System Control Module 29 is formatted by the System Control Module, as described above, and then entered into a temporary data storage register 38, as well as into Record/Playback Deck 21. The address on optical disc D7 into which data input to temporary storage register 38, is to be written is stored in a temporary address storage register 39. Data in registers 38 and 39 which have successfully been recorded on the optical disc are overwritten with new blocks of data not yet recorded. However, if a recording error is detected by System Control Module 29, a recording error signal status signal is output on a terminal 40 of the System Control Module. Recording error output terminal 40 of System Control Module 29 is connected to control input terminal 42 of Control Logic Module 41. When a recording error status signal is present on control input terminal 42 of Control Logic Module 41, unsuccessfully recorded data elements along with the addresses of Data File Section D34 (FIG. 11) at which each data element should have been recorded, are gated by control logic module 41 from data and address registers 38 and 39, respectively, into an Error Data FIFO 43. Along with each data element and its address which is gated into Error Data FIFO 43 from Control Logic Module 41, a number representing the instant state of a data element counter 44, is also written. Each time another data element and address is input to Error Data FIFO 43, counter 44 is incremented and the new count stored along with the new data element and address. The purpose of the count number stored with each unsuccessfully recorded data element and data file section address is to indicate where on the optical disc each such data element and its address will subsequently be stored, as will now be described.

After a complete data file has been recorded onto optical disc D7, each data element in the data file which was not successfully recorded, and the address in Data File section 34 of the disc where the data element should have been recorded, is recorded in another location of the disc referred to as the Data Error Section D44. As shown in FIG. 11, Data Error Section D44 on the disc is preferably located adjacent the end of the Data Files Section D34.

Upon completion of the recording of a data file, System Control Module 29 initiates a first subsidiary recording cycle of optical disc D7, if any recording error occurred during the recording of the data file. In the subsidiary recording cycle, each unsuccessfully recorded data element, along with the address in the Data File Section D34 on disc D7 where it should have been recorded, is sequentially output from Error Data FIFO 43, to System Control Module 29, along with each data element and its address, a Data Error Section address, derived from data element counter 44 as described above, is input to Control Module 29. System Control Module 29 then formats the data and causes each data element and its address to be recorded at that address in the Data Error Section D44 of optical disc D7 indicated by the number previously output by counter 44, and stored in Error Data FIFO 43. When Error Data FIFO 43 has been emptied, the subsidiary recording cycle is halted.

A particularly useful aspect of the novel error reduction method and apparatus according to the present invention, is the capability of the system to re-initiate a second and successive subsidiary recording cycles, should a recording error occur during the recording of data in the Data Error Section D44 during a prior subsidiary recording cycle.

Figure 16A:
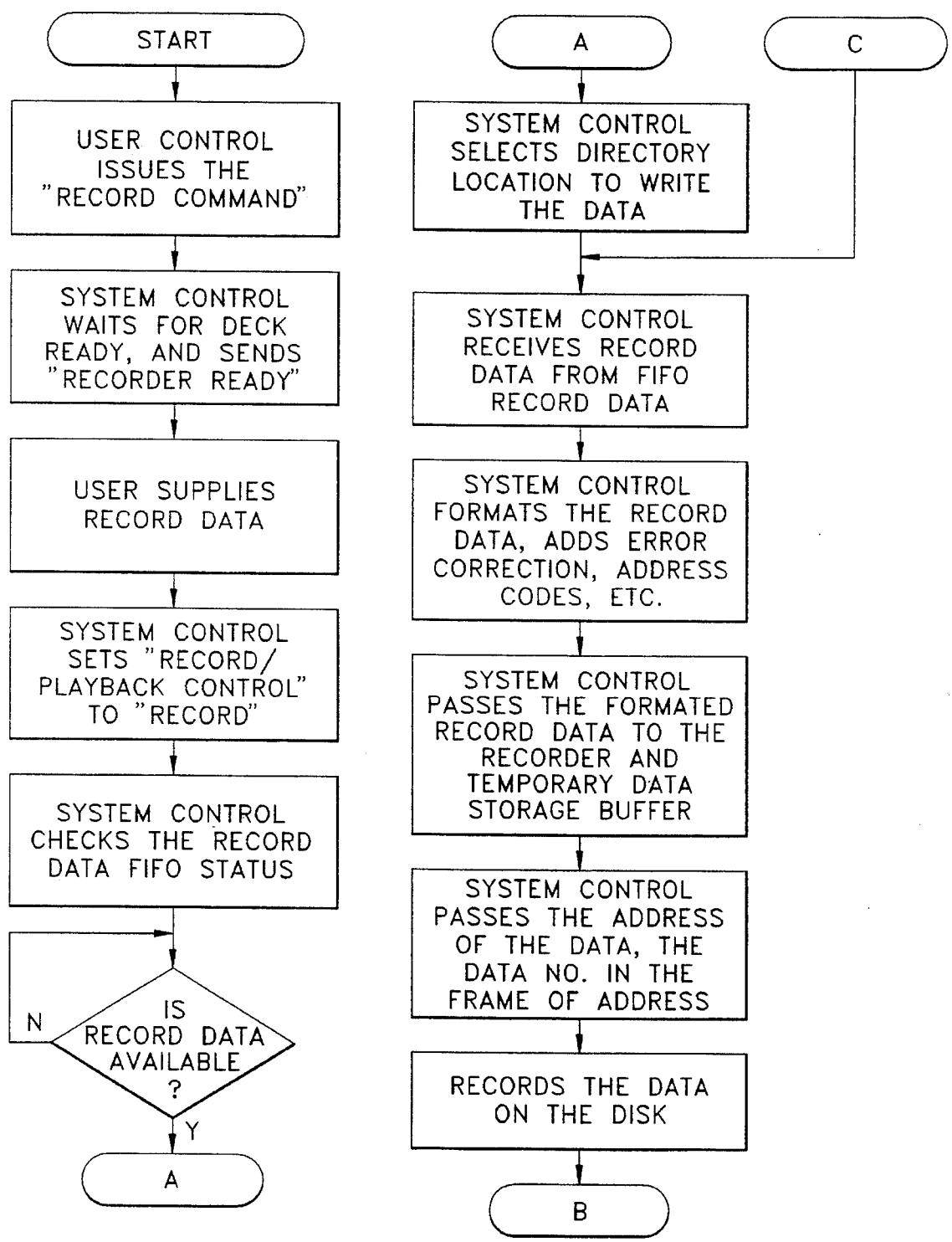
FIGS. 16a–16c comprise a flow chart of the overall operation of an optical recording and playback system utilizing the novel method of error reduction according to the present invention.
Figure 16B:
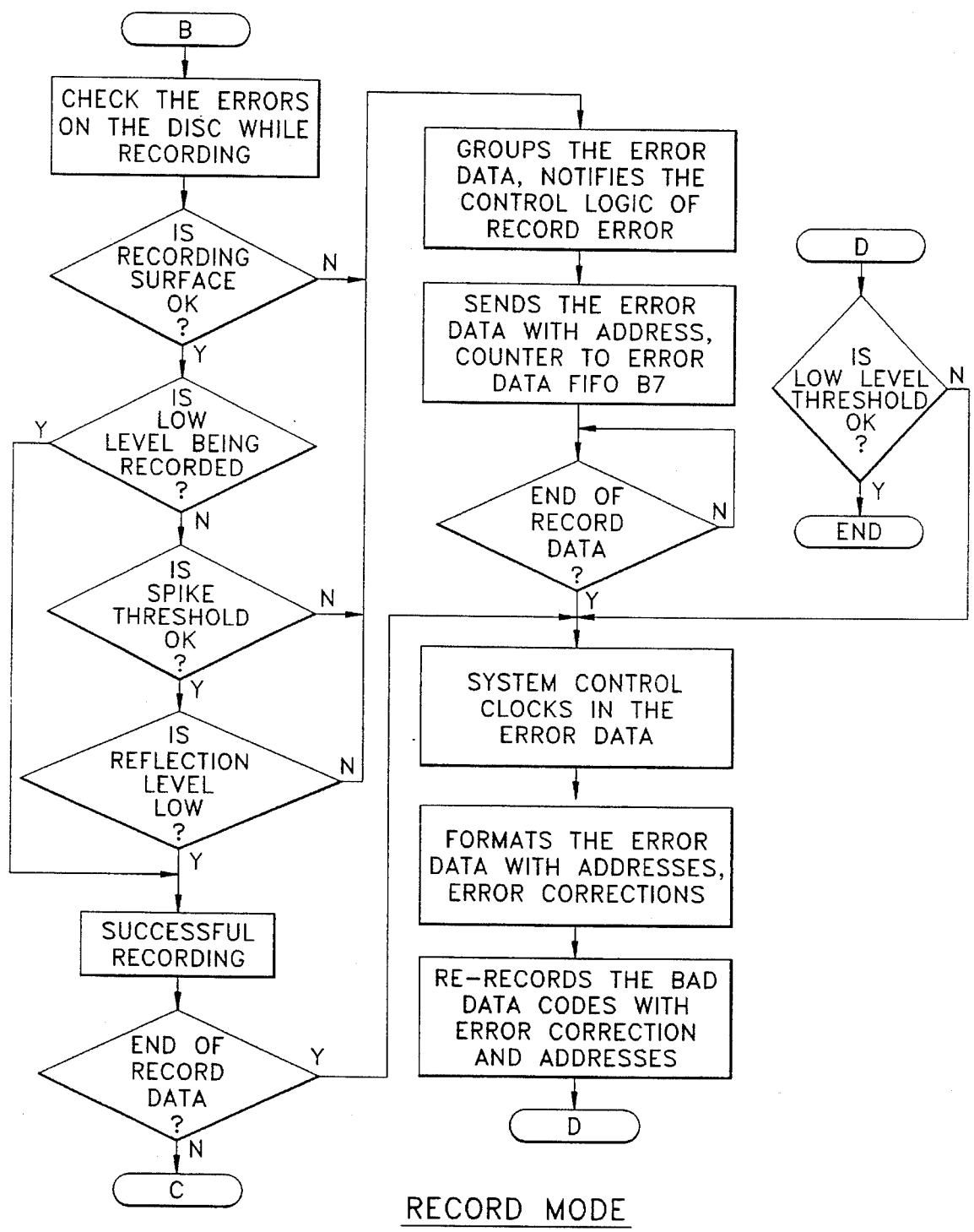
Figure 16C:
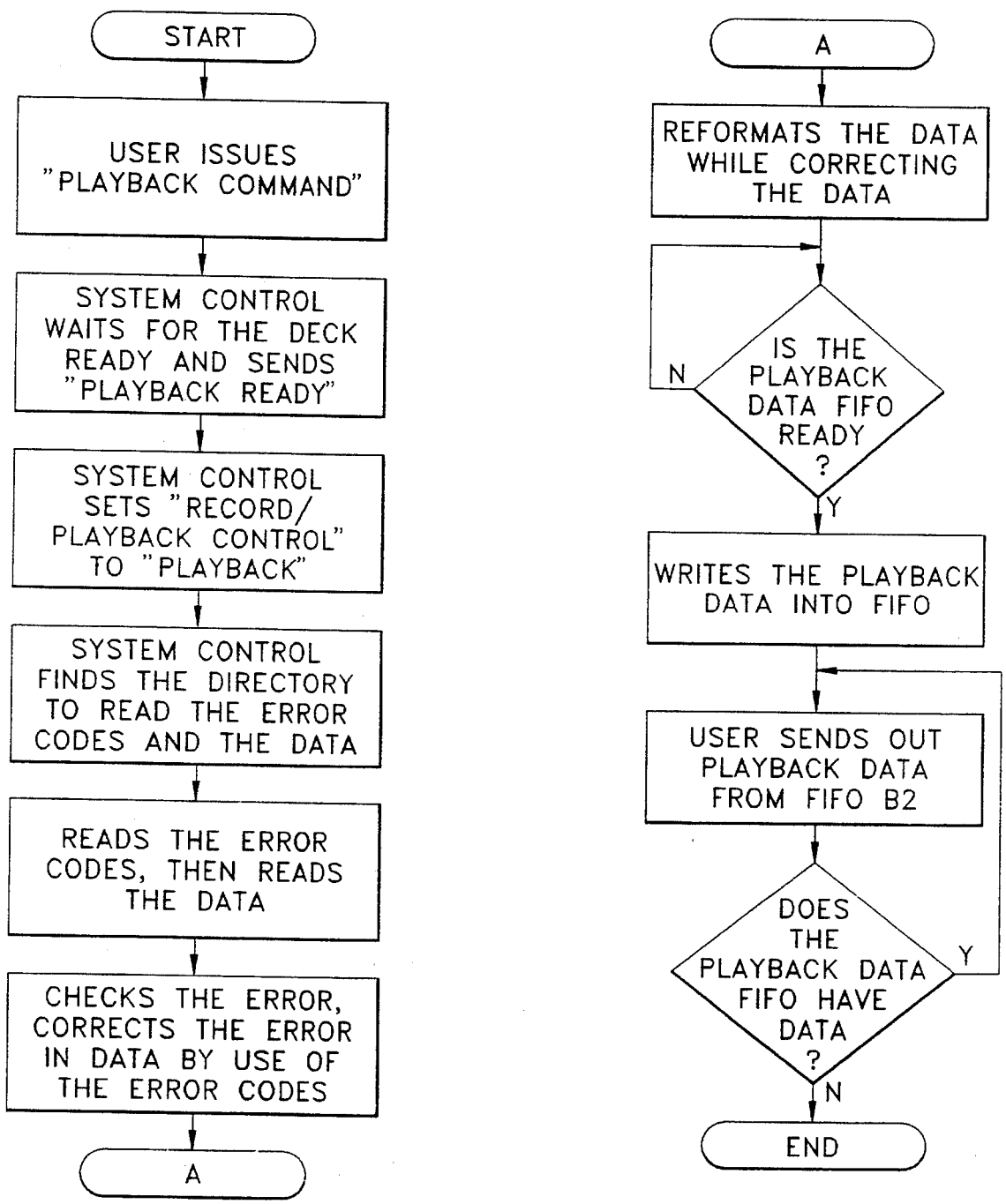

After the completion of the desired number of error-reduction subsidiary recording cycles, the names of the data file, addresses of the data file section 34 in which recording errors were detected, and addresses of Data Error Section 44 where corrected data is stored are recorded in a File Directory Section D45 of optical disc D7. FIGS. 16a and 16b summarize via a flow chart the record mode described above.

PLAYBACK MODE

Error reduction apparatus 20 utilizes data stored in Data Error Section D44 of optical disc D7 to produce a corrected data stream during playback of the disc, as follows.

As shown in FIG. 9, System Control Module 29 includes a two-input "multiplexer" 46 whose output terminal 47 is connected to a data input terminal 49 of a Playback Data FIFO 48. Multiplexer 46 actually comprises circuit means for formatting data from two separate sources, as well as alternatively gating data from either source to an output terminal. Multiplexer 46 has a first input port 50 connected to data output terminal 51 of Playback/Record Deck 21. Also, multiplexer 46 has a second input port 52 connected to the output port 53 of a Correcting Data Buffer 54.

When a playback command is transmitted to System Control Module 29 from User Module 25, the System Control Module responds by issuing commands to Record/Playback Deck 21. Thus, Record/Playback Deck 21 is first commanded to position the laser read head over the inner, File Directory Section D45 of an optical disc D7. At this position, the names and locations of each data file within the Data Files Section 34 are read out and stored in temporary memory locations within System Control Module 29. Also at this position, the addresses of the Data File Section D34 at which recording errors occurred, and the addresses of Data Error Section D44 where corrected data is stored are read out and stored in temporary memory locations within Systems Control Module 29.

After the contents of File Directory Section 45 of optical disc D7 have been read out, System Control Module 29 commands the laser read head of Record/Playback Deck 21 to be positioned over those locations in the Data Error Section D44 which contain corrected data. Corrected data, and the addresses in the Data Files Section D34 where the corrected data should have been recorded, are then read out of Data Error Section D44 of optical disc D7. Corrected data and addresses may be stored in any convenient memory means. As shown in FIG. 9, those data and addresses are stored in a correcting Data Buffer 54. Data and addresses are input to Correcting Data Buffer 54 on its input terminal 55.

After the contents of Data Error Section D44 (FIG. 11) of optical disc D7 have been read and stored in Corrected Data Buffer 54, System Control Module 29 commands the laser read head of Record/Playback Deck 21 to be positioned over the first track in Data Files Section D34 of optical disc D7. Now, when data is read out from those locations of Data Files Section D34 of optical disc D7 where no recording errors were detected, multiplexer 46 transmits data from the Data Files Section 34 on input port 50 to output port 47 of multiplexer 46, and thence to playback data FIFO 48. However, at those locations at which recording errors occurred, a signal generated by System Control Module 29 and applied to control input terminal 56 of multiplexer 46 commands the multiplexer to transmit data in Correcting Data Buffer 54, connected to input port 52 of multiplexer 46, to output port 47 of the multiplexer 46. Thus, the data stream at output terminal 47 of multiplexer 46, and hence, ultimately at the output terminal 57 of playback data FIFO 48, will consist of data from the tracks of Data File section D34 of optical disc D7, interleaved where necessary by corrected data elements from Correcting Data Buffer 54, which corrected data were previously read out from Data Error Section D44.

FIGS. 15(a) and (b) illustrate in a block-flow diagram the foregoing residual error reduction method and apparatus for optical recording. FIGS. 16(a), (b) and (c) summarize in flow-chart form the sequence of steps comprising the playback mode according to the present invention.

Although a particular embodiment of the invention has been illustrated and described, it is understood that obvious modifications and alterations of components thereto within the ambit of the disclosure and claims is anticipated. It is intended therefore that the following claims be interpreted to cover all such modifications which fall within the spirit and scope of the invention.

What is claimed is:

1. A method for consistently, and invariably recording a cylindrical, spherically truncated pit of ideal dimensions corresponding to a unitary spike pulse of minimum optically recordable duration in real time, feedback monitored, optical recording system utilizing a conventional recording medium having photosensitive and reflective layers, comprising the steps of:

moving said recording medium with respect to the path of a laser beam focused on said medium;

continuously radiating said photosensitive layer of said medium with said laser beam at a read power level and monitoring the total reflection of said beam from said reflective layer;

initiating a data pit in said medium by instantaneously increasing intensity of said laser to a peak write power level on the rise of said pulse for a brief threshold interval, effecting an instantaneous chemical decomposition and physical reaction of a point in said photosensitive layer, thereby causing said reflective layer to deflect and indent to form said pit, thereby in turn effecting less and less laser reflection, and in turn causing said feedback system to decrease laser power;

defining and detecting a negative, down slope null inflection point on said deflection of said reflective layer at which point said laser beam is deemed no longer to be reflected and said pit is deemed to be accurately recorded; and terminating said data pit in said medium by instantaneously decreasing intensity of said laser to a continuous low read power level on detecting positive, up slope null inflection point, thereby effecting termination of chemical decomposition and physical reaction of said photosensitive layer and thereby causing said reflective layer to deflect less and less, and in turn effecting more and more laser reflection eventually reaching full reflection at said read power level.

2. A method for recording a variable length data slot correlating to a variable length pulse of data in a real time, feedback monitored laser-optical recording system utilizing a conventional recording medium having photosensitive and reflective layers, comprising the steps of:

moving said recording medium with respect to the path of a focused laser beam;

continuously irradiating said photosensitive layer with said laser beam at a read power level and monitoring the total reflection of said beam from said reflective layer;

initiating a variable length data slot in said medium by instantaneously increasing intensity of said laser to a peak write power level on the rise of said pulse for a brief threshold interval, effecting instantaneous chemical decomposition and physical reaction of a point in said photosensitive layer, thereby causing said reflective layer to deflect and indent, in turn effecting less and less laser reflection, and in turn causing said feedback system to decrease laser power;

defining and detecting an initial null inflection point on said initial deflection and indentation of said reflective layer at which point said laser beam is deemed no longer to be reflected and said slot is deemed to be accurately initiated;

momentarily turning said laser off at said initial inflection point;

increasing laser write power again to a defined, photosensitive threshold, continuous-slot-forming level for the duration of said variable length pulse, effecting a continuous, noncumulative chemical decomposition and physical reaction of said photosensitive layer and a corresponding continuous deflection and indentation of said reflective layer;

terminating said data slot in said medium by initiating a terminal inflection by Instantaneously decreasing intensity of said laser to a low read power level on the fall of said pulse, thereby effecting termination of chemical decomposition and physical reaction of said photosensitive layer and thereby causing said reflective layer to deflect and indent less and less in turn affecting more and more laser reflection;

defining and detecting a terminal null point on said terminal inflection at which point said laser beam is deemed to be fully reflective and said slot is deemed to be accurately terminated, at which point said laser is again maintained at a continuous read power level.

3. Apparatus for optically recording a spike pulse on an optical recording medium, comprising:

an analog input terminal;

a current blocking diode coupled to said Input terminal;

latch means coupled in parallel with said diode for expanding said spike pulse for a period long enough to be optically recorded;

unity pulse generator means coupled to and as input to said latch for setting the minimum period, pulse width;

timer means coupled to said latch means for cumulatively accounting for time delay incurred in expanding spike pulses too short to record;

a differential amplifier laser driver coupled to said diode and latch and having a command input and a demand input;

a diode laser coupled to and driven by said differential amplifier driver;

a beam splitter for reflecting a part and for providing the remainder of a beam of said laser to be focused upon said recording medium;

a photo diode for receiving a reflection of said laser beam from said recording medium;

an optical reflection feedback lead coupling said photodiode to said differential amplifier; and peak detector means coupling said photodiode to said latch for deactivating said latch when said reflective layer has been sufficiently deflected and indented and said pulse has been determined to be ideally recorded.

4. Apparatus for recording, on an optical recording medium, analog data which may include spike pulses of such brief duration that would normally preclude capability for optically recording said pulses, comprising:

an analog signal input terminal;

a reverse current blocking diode coupled to said input terminal;

a differential amplifier, laser driver coupled to said diode via a command input terminal of said driver;

a pulse expanding latch coupled in parallel with said diode via an on terminal of said latch;

a pulse length setting, unity pulse generator coupled to and operating upon said latch;

timer means coupled to said latch for cumulating time delay encountered in said pulse expansion step;

diode laser means for optically recording analog data upon said recording medium via a focused laser beam;

photodiode means disposed In a reflection path of said beam for receiving and monitoring reflection of said laser beam from said recording medium;

a feedback lead coupling said photodiode to a demand input terminal of said laser driver; and a peak detector, coupling said feedback lead to an off terminal of said latch.

5. A method for accurately recording and reducing errors in the recording of information along a track or tracks on an optical recording medium having a photo-sensitive layer comprising;

(a) focusing laser beam energy and controlling its Intensity onto said layer; and (b) controlling and moving the photosensitive recording medium relative to the laser beam for recording thereon; and (c) monitoring said layer prior to recording information thereon to verify that said layer is present and sufficiently unaltered in transmissivity to represent the absence of recorded data thereon;

(d) monitoring said layer during the recording of pulses of null information thereon to verify that the transmissivity of said layer remains sufficiently high during the recording of said null Information as to be read as null; and (e) monitoring said layer during the recording of pulses of non-null information to verify that the transmissivity of said layer is reduced to a sufficiently low level during the recording of pulses of non-null information on said layer as to be read as non-null; and (f) storing any non-verified portions of said recording information in temporary solid state memory storage means; and (g) re-recording in a subsequent recording cycle on a second location on said recording medium any information stored in said memory storage means that was not successfully recorded on a first location on said medium, as indicated by the failure of any of the sufficiency verification tests of steps (b) and (c).

6. The method of claim 5 further including the recording In said second location the addresses of information that was unsuccessfully recorded in an initial recording cycle and subsequently recorded in a subsequent recording cycle, along with said re-recorded data.

7. A method of reducing errors in the playback of Information recorded as described in claim 5 wherein;

(a) said re-recorded data and associated addresses are first read out from said optical medium and placed in temporary memory storage means, (b) said originally recorded data is read out from said optical medium, and (c) said data that was re-recorded in said subsequent recording cycles is interleaved with said originally recorded information in those places where said originally recorded information was not successfully recorded in said original recording cycle, thereby correcting information output during said playback.

8. An apparatus for reducing errors in the recording of information by variable length photo-pulses on an optical medium having a photo-sensitive layer comprising;

(a) first memory storage means for storing said information to be recorded on said optical medium, (b) means for monitoring said layer by beaming low energy null photo pulses thereon and measuring the photoreflectivity prior to recording information to verify that said layer is present and sufficiently unaltered in transmissivity to represent the absence of recorded data thereon, and to verify that the transmissivity of said layer remains sufficiently high during the recording of said null information; and (c) means for monitoring said layer by beaming higher energy non-null photopulse thereon and measuring the photoreflectivity during the recording to verify that the transmissivity of said layer is reduced to a sufficiently low value to be read as non-null information.

(d) control means responsive to the failure of any of said verification tests performed by said means (b) and (c) above in causing any information that was unsuccessfully recorded on a first location to be output from said first memory storage means and to initiate a subsidiary recording cycle in which said information is recorded in a second location of said optical recording medium.

9. The apparatus of claim 8 wherein the addresses of initial locations on said optical recording medium where information was initially unsuccessfully recorded and subsequently recorded in said second locations are stored along with said information.

10. The apparatus of claim 9 further Including playback means for reducing errors in the playback of Information recorded as described in claim 8, said playback means comprising;

(a) correcting-data memory storage means, (b) means for reading, from said Second locations on said optical recording medium, data and the addresses thereof which were not initially recorded correctly, and inputting said correcting data and addresses into said correcting-data memory storage means, (c) means for reading out data from said first data storage locations of said optical recording medium, and (d) means for interleaving correcting data from said correcting-data memory storage means with data read out from said first data storage locations of said optical recording medium at those sequential locations in said first data storage locations where data was unsuccessfully recorded, thereby inserting where necessary correcting information into the information stream output from said apparatus.

11. The apparatus of claim 10 further including spike-monitoring means for monitoring said layer during the recording of non-null information thereon to verify that the power level of radiant energy used to alter said layer and transmitted therethrough rises to an initial high value, and decreases to a low level as said alteration is effected.

12. The apparatus of claim 11 wherein said spike-monitoring means comprises in combination a comparator and difference amplifier, the input terminal of the comparator being connected to the output terminal of the amplifier, a non-inverting input terminal of said difference amplifier being connected to a recording information command signal source, and an inverting input terminal of said amplifier being connected to a source of signals inversely proportional to the transmissivity of said layer.

13. The apparatus of claim 10 wherein said data monitoring means comprises a comparator, the input terminal of which is connected to the output of an amplifier whose input signal level is proportional to the intensity of radiation transmitted through said layer.

14. The apparatus of claim 10 wherein said data monitoring means comprises a comparator, the input terminal of which is connected to the output of an amplifier whose input signal level is proportional to the intensity of the quotient of the radiation transmitted through said layer, divided by the intensity of radiation incident on said layer.

15. An apparatus for reducing errors in the recording end playback of data on an optical recording medium having a photo-sensitive layer comprising;

(a) means for detecting errors in the recording of input data in an initial location of said medium, (b) means for storing input data which was unsuccessfully recorded, along with the corresponding addresses of those initial locations of said medium which were unsuccessfully recorded, said data and addresses being referred to collectively as error data.

(c) means for recording said error data in a subsequent location of said medium, (d) means for reading out and storing said error data recorded in said subsequent locations, (e) means for reading out said input data successfully recorded in said initial locations, and (f) means for outputting said successfully recorded data, interleaved where necessary with said error data.

16. The apparatus of claim 15 wherein said means for detecting recording errors comprises monitoring the optical transmissivity of said optical recording medium during the recording process.

17. The apparatus of claim 16 wherein said means for detecting reading errors is further defined as being operative substantially throughout the duration of recording on said optical recording medium.

18. The apparatus of claim 17 wherein said detection means is further defined as being capable of determining that said recording medium has an optical transmissivity above a first threshold level, thereby confirming that null information is capable of being recorded on said medium.

19. The apparatus of claim 18 wherein said detection means is further defined as being capable of determining that said recording medium has an optical transmissivity below a second threshold level, thereby confirming that non-null information is recorded on said medium.

20. The apparatus of claim 19 wherein said detection means is further defined as being capable of determining that a portion of optical radiation used to record said photo-sensitive layer is initially transmitted with little attenuation, and later is attenuated more, as said layer is altered by said radiation.

21. The apparatus of claim 20 wherein said detection means is operatively interconnected to an error signal source, one input of said error signal source being connected to a recording data command input and a second input of said error signal source being connected to a signal source proportional to the instantaneous transmissivity of said layer.

22. The apparatus of claim 21 wherein said error signal source is further defined as being a difference amplifier used to generate a closed-loop error signal for controlling the intensity of said radiation source.

* * * * *